(12) United States Patent
Fujisaki

(10) Patent No.: US 12,452,506 B2
(45) Date of Patent: Oct. 21, 2025

(54) IMAGE CAPTURING APPARATUS

(71) Applicant: CANON KABUSHIKI KAISHA, Tokyo (JP)

(72) Inventor: Tsuyoshi Fujisaki, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 73 days.

(21) Appl. No.: 18/438,806

(22) Filed: Feb. 12, 2024

(65) Prior Publication Data
US 2024/0430550 A1 Dec. 26, 2024

(30) Foreign Application Priority Data

Feb. 15, 2023 (JP) ................................. 2023-021865

(51) Int. Cl.
| | |
|---|---|
| H04N 23/51 | (2023.01) |
| H04N 23/55 | (2023.01) |
| H04N 23/611 | (2023.01) |
| H04R 1/08 | (2006.01) |
| H04R 1/22 | (2006.01) |

(52) U.S. Cl.
CPC ............. *H04N 23/51* (2023.01); *H04N 23/55* (2023.01); *H04N 23/611* (2023.01); *H04R 1/08* (2013.01); *H04R 1/222* (2013.01); *H04R 2499/11* (2013.01)

(58) Field of Classification Search
CPC ...... H04N 23/51; H04N 23/611; H04N 23/55; H04R 1/08; H04R 1/222; H04R 2499/11
USPC .......................................................... 348/373
See application file for complete search history.

(56) References Cited

U.S. PATENT DOCUMENTS

| | | | |
|---|---|---|---|
| 9,363,596 B2 | 6/2016 | Dusan | |
| 10,224,033 B1 * | 3/2019 | Lim | ........................ G06F 3/165 |

FOREIGN PATENT DOCUMENTS

| | | |
|---|---|---|
| JP | 2009049947 A | 3/2009 |
| JP | 4931907 B2 | 5/2012 |
| JP | 2019054440 A | 4/2019 |

* cited by examiner

*Primary Examiner* — Joel W Fosselman
(74) *Attorney, Agent, or Firm* — Cowan, Liebowitz & Latman, P.C.

(57) ABSTRACT

An image capturing apparatus that can be worn by a user as a result of being hung around a neck of the user includes an image capturing circuit, a first microphone that obtains an environmental sound, at least two second microphones that are intended to obtain a voice of the user and are arranged at a first distance from each other, a detection unit configured to detect a direction of a face of the user; and a sound processing unit that, with use of sound signals from the at least two second microphones, generates a directional sound signal that has directionality corresponding to the direction of the face of the user detected by the detection unit.

13 Claims, 19 Drawing Sheets

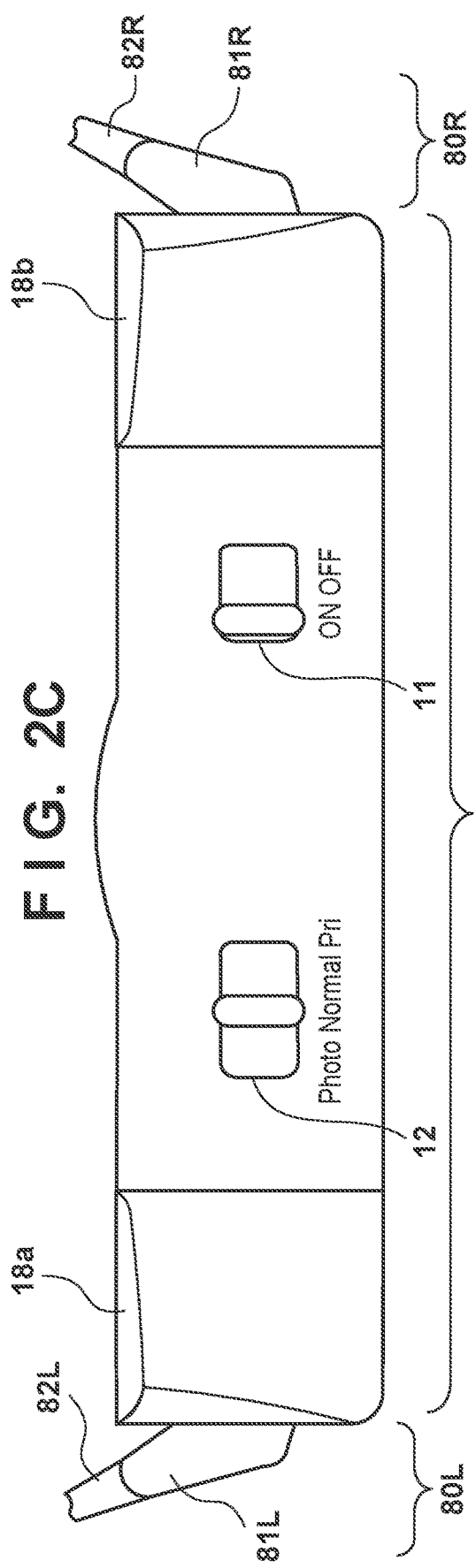
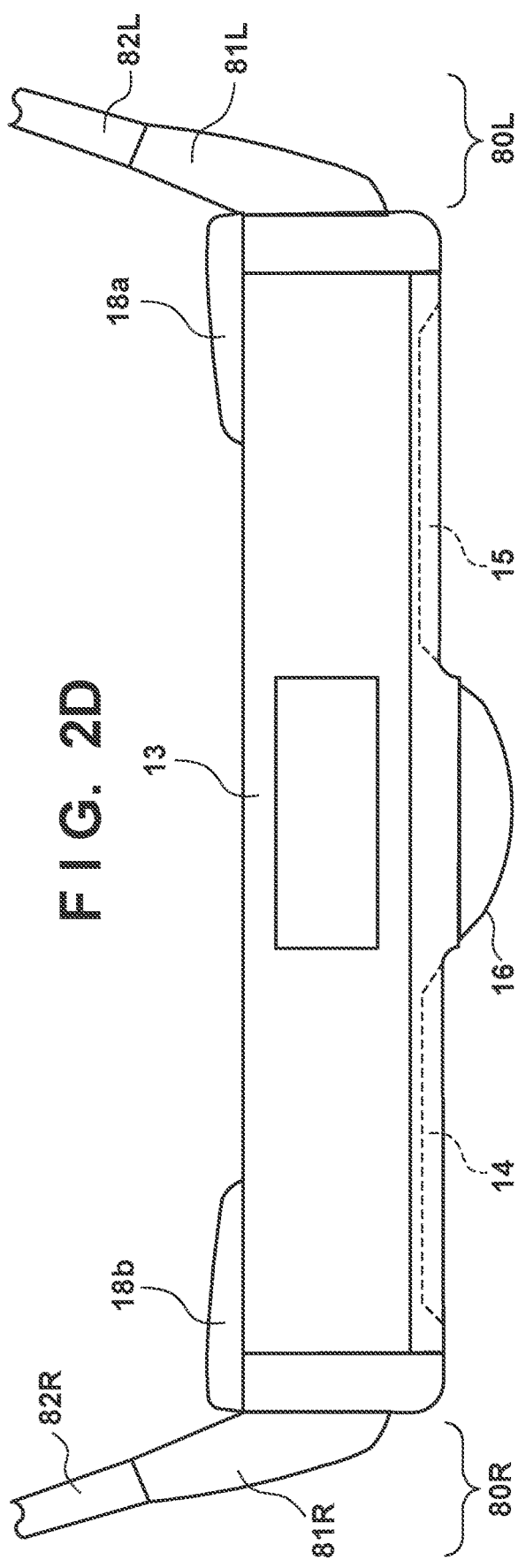

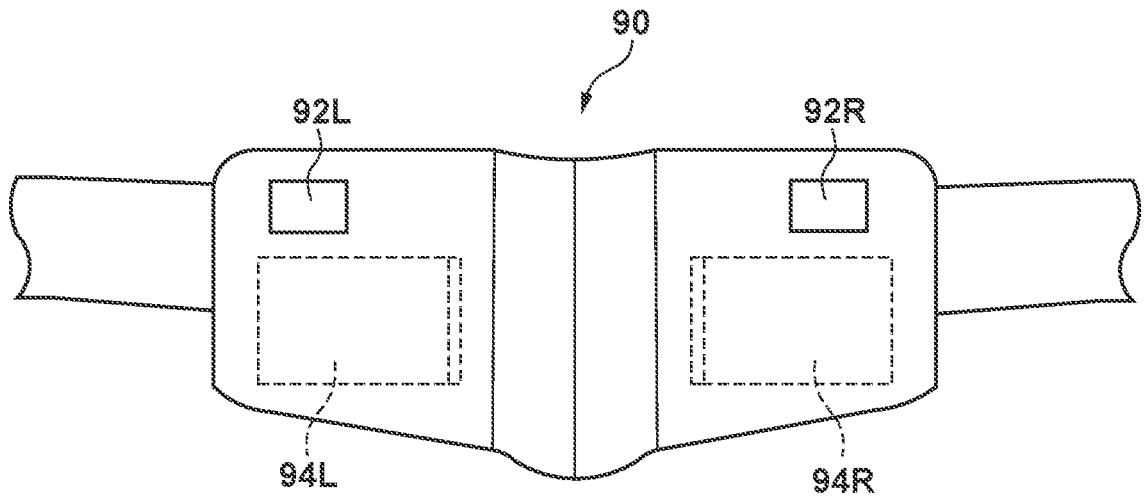
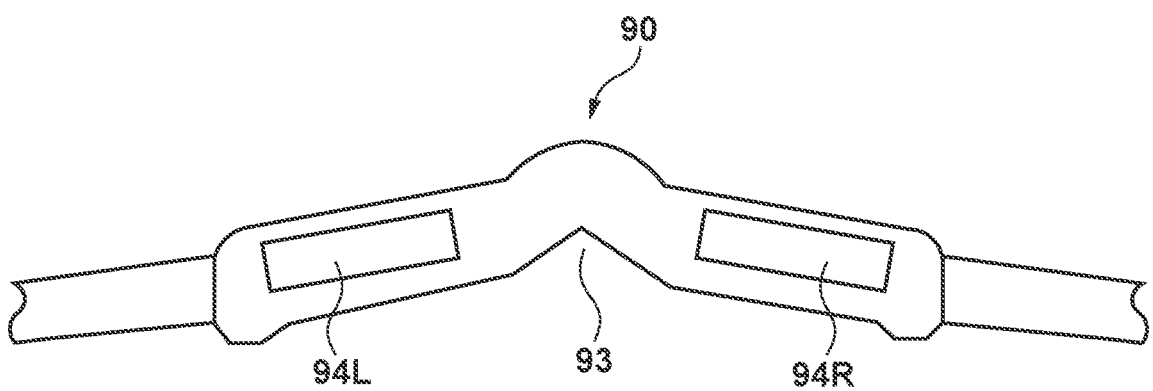
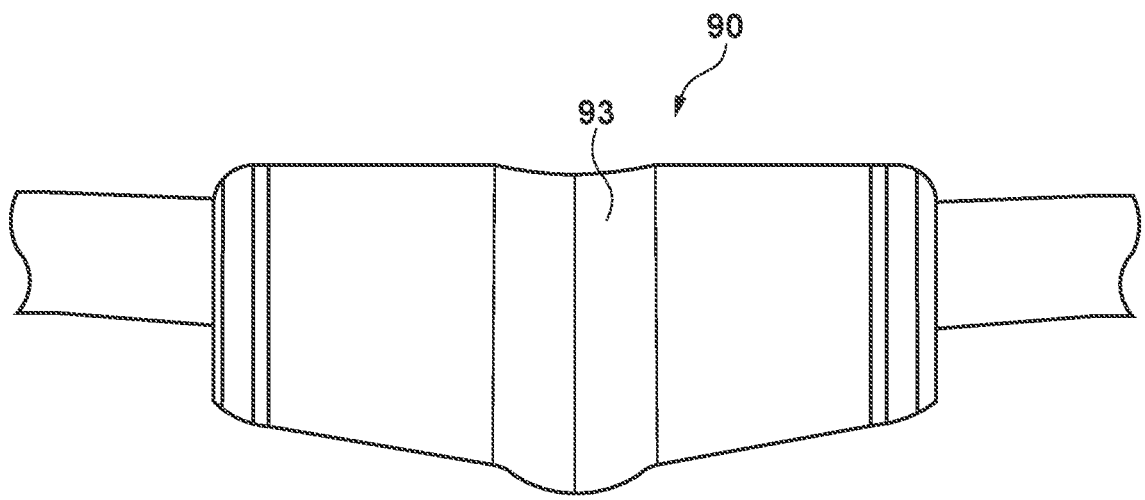

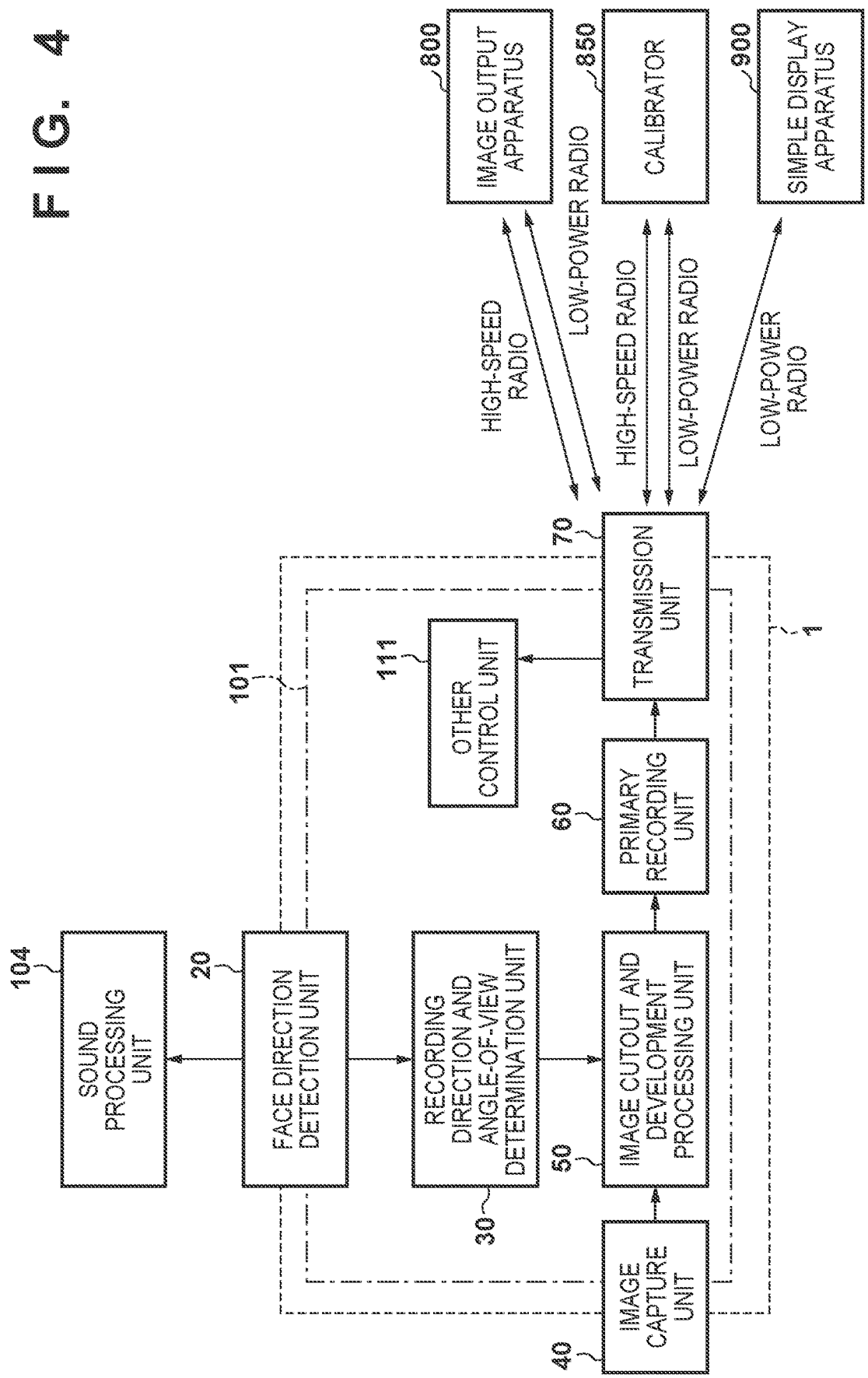

F I G. 11
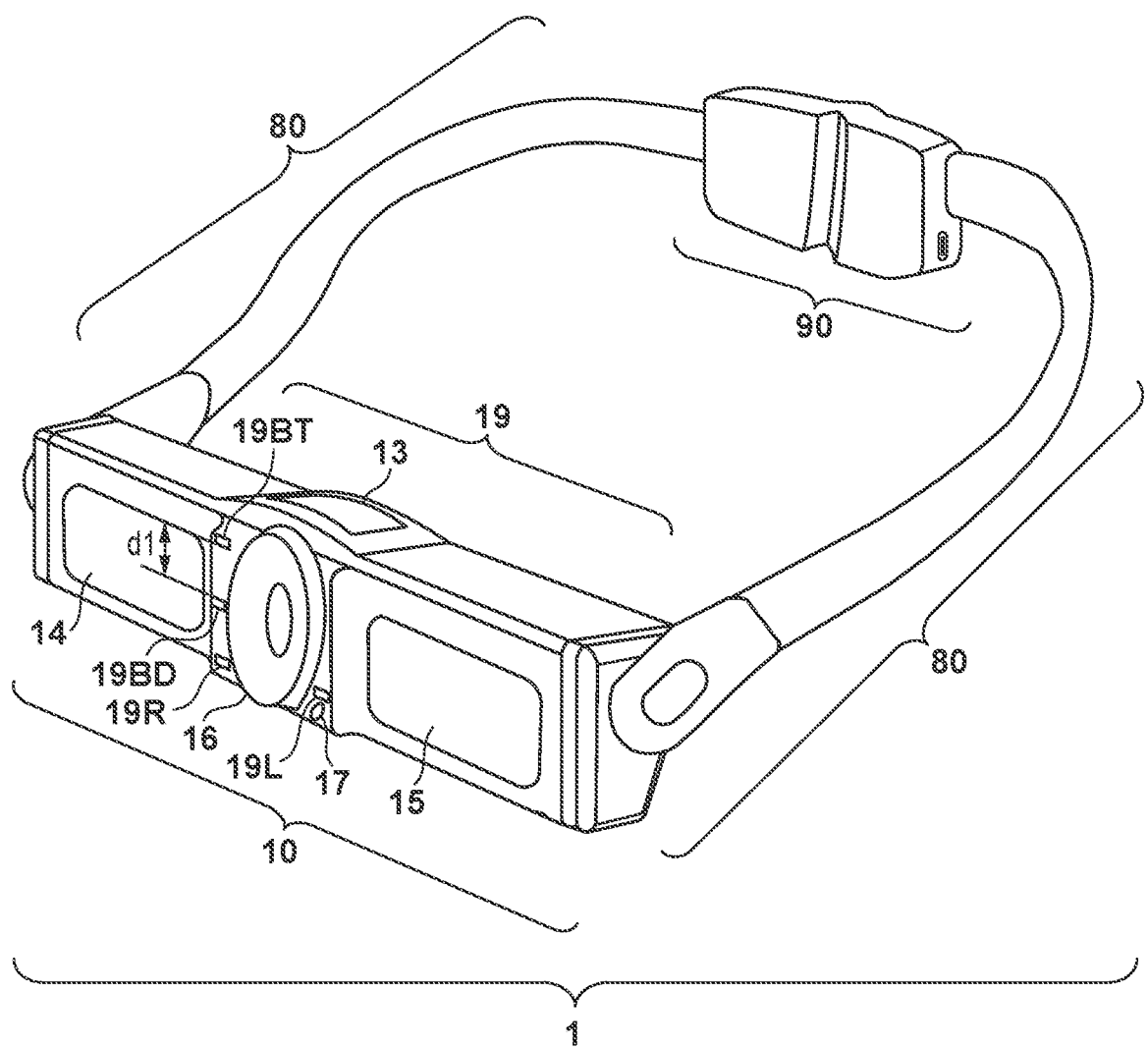

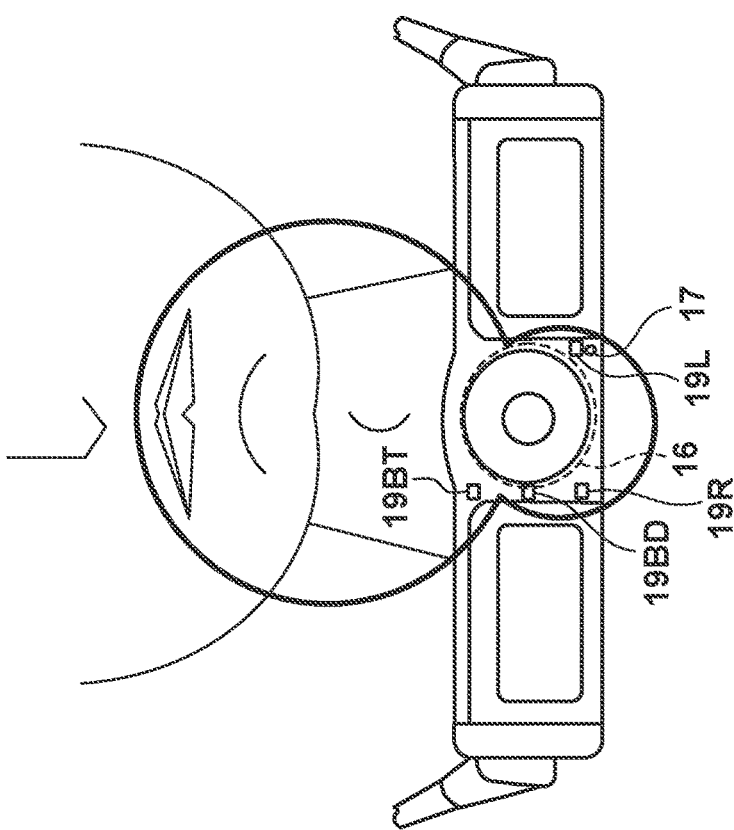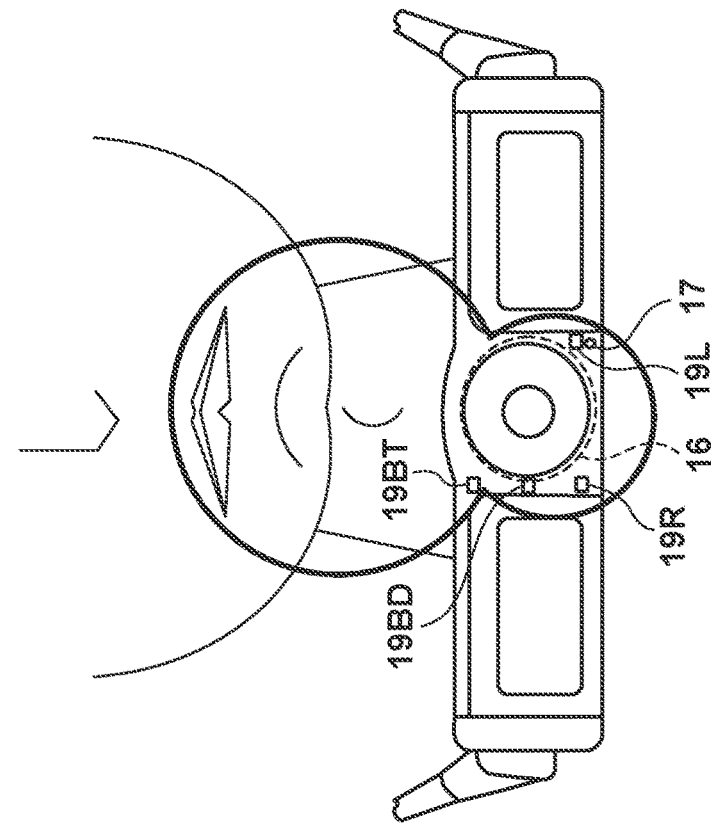

IMAGE CAPTURING APPARATUS

BACKGROUND OF THE INVENTION

Field of the Invention

The present invention relates to an image capturing apparatus with a sound pickup function.

Description of the Related Art

Conventionally, in shooting that uses a camera, a photographer needs to keep the camera facing the shooting direction. This causes the photographer to concentrate on manipulating the camera for shooting, and makes it difficult for the photographer to focus on matters other than the act of shooting, thereby preventing the photographer from concentrating their focus on experiences in a shooting environment.

For example, in a case where a parent takes a shot of their child, the parent, who is the photographer, cannot play with their child, and cannot perform shooting if they play with their child. That is to say, it is difficult to perform shooting and gain an experience at the same time. Similarly, also in a case where shooting is performed simultaneously with an activity like a sport, it is difficult to experience the sport simultaneously with the execution of shooting while hand-holding a camera.

Conventionally, a wearable camera that can be worn on a body has been known. A photographer performs shooting while wearing such a wearable camera; as a result, for example, a parent, who is the photographer, can record images while gaining an experience of playing with their child.

Furthermore, in recent years, many products are equipped with a function of recognizing voice commands so that a device can be manipulated without a user's hand or finger manipulating buttons and the like. In order to accurately recognize voice commands, it is necessary to recognize voices clearly even under an environment where noise exists. With the above-described device that performs shooting while being worn on a body (called a wearable device), a large amount of noise occurs, including not only ambient noise but also the user's snorting and breathing sounds, rustling of the device against the body, and so on, thereby reducing the sound pickup quality. Therefore, in a case where such a wearable device is equipped with a function of recognizing voice commands, it is possible that the voice commands cannot be recognized accurately due to noise.

In view of this, Japanese Patent No. 4931907 discloses a technique to improve the sound pickup quality by changing the directionality of a sound pickup unit of a wearable terminal. This technique switches among the directions of directionality, and between the presence and absence of directionality, based on the magnitude of motion of the wearable terminal.

Also, the specification of U.S. Pat. No. 9,363,596 discloses a technique to improve the sound pickup quality by determining the directionality based on an output of a built-in inertial sensor and on the difference between outputs of one or more microphones.

However, according to the techniques described in Japanese Patent No. 4931907 and the specification of U.S. Pat. No. 9,363,596, as the directionality is determined based on the motion of the terminal, the motion of the terminal and the direction of the face may not be linked to each other in a case where a voice of a user is obtained. This gives rise to the problem that it is difficult to change the sound pickup directionality in accordance with a voice, and a voice is not distinguished accurately in some cases.

SUMMARY OF THE INVENTION

The present invention has been made in view of the aforementioned problem, and provides an image capturing apparatus that can improve the quality of pickup of a voice of a photographer.

According to a first aspect of the present invention, there is provided an image capturing apparatus that can be worn by a user as a result of being hung around a neck of the user, the image capturing apparatus comprising: an image capturing circuit; a first microphone that obtains an environmental sound; at least two second microphones that are intended to obtain a voice of the user and are arranged at a first distance from each other; a CPU; a memory storing a program that, when executed by the CPU, causes the CPU to function as a detection unit configured to detect a direction of a face of the user; and a sound processing unit that, with use of sound signals from the at least two second microphones, generates a directional sound signal that has directionality corresponding to the direction of the face of the user detected by the detection unit.

According to a second aspect of the present invention, there is provided an image capturing apparatus that includes an annular casing and can be worn on a neck of a user, the image capturing apparatus comprising: a main body that includes an image capturing circuit; a mount member connected to the main body; a microphone; a CPU; a memory storing a program that, when executed by the CPU, causes the CPU to function as a detection unit configured to detect a direction of a face of the user when the image capturing apparatus is worn by the user, a sound processing unit configured to execute processing for giving directionality to a sound signal from the microphone in accordance with the direction of the face of the user detected by the detection unit, and a control unit configured to recognize a voice command from the user based on a sound signal from the sound processing unit, and performing control corresponding to the voice command, wherein the microphone, the CPU, and the memory are provided in the main body, and the main body and the mount member compose a part of the annular casing.

Further features of the present invention will become apparent from the following description of exemplary embodiments with reference to the attached drawings.

BRIEF DESCRIPTION OF THE DRAWINGS

FIG. 2C is a rear view of the main body unit.

FIG. 2D is a top view of the main body unit.

FIGS. 3A to 3C are diagrams for describing the details of the battery unit.

FIG. 4 is a diagram showing a functional block configuration of the camera.

FIG. 11 is an external view of a camera according to a second embodiment.

FIGS. 12A and 12B are diagrams showing a change in a sound pickup direction in the second embodiment.

DESCRIPTION OF THE EMBODIMENTS

Figure 1A:
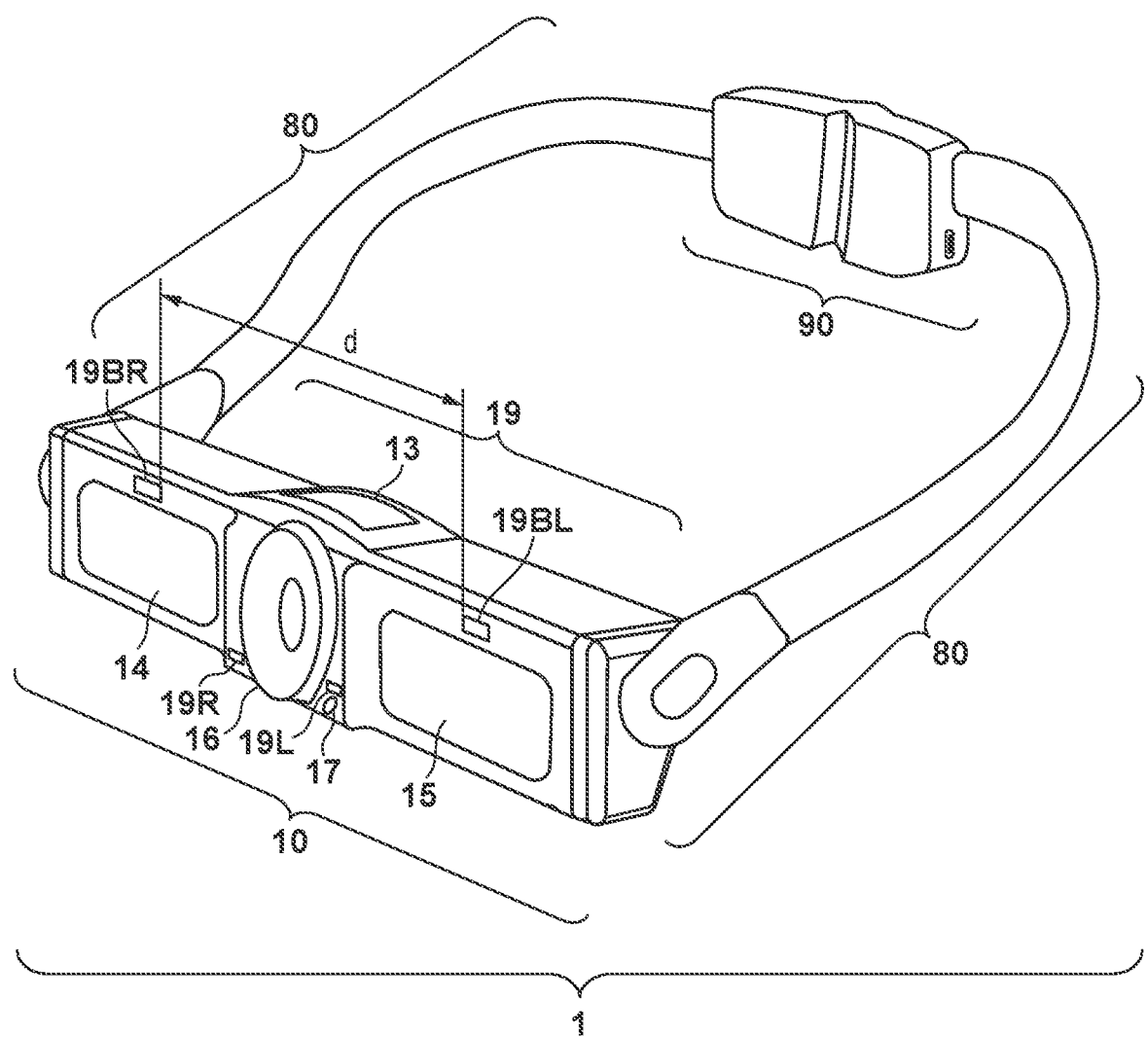
FIG. 1A is an external view of a camera according to a first embodiment of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

FIG. 1A to FIG. 1D are diagrams for describing a camera system in a first embodiment of the present invention. The camera system of the present embodiment includes a camera 1, which includes a main body unit 10, and a display apparatus 800 that is configured separately therefrom. Note that although the present embodiment is described using an exemplary case where the camera 1 and the display apparatus 800 are separate entities, they may be configured integrally. Also, a person who is wearing the camera 1 hung around their neck will be hereinafter referred to as a user.

FIG. 1A is an external view of the camera 1 that can be worn by the user around their neck.

In FIG. 1A, the camera 1 includes the main body unit 10, a battery unit 90, and a mount unit 80 that connects between the main body unit 10 and the battery unit 90 (power supply means). The mount unit 80 is an annular member that connects between the main body unit 10 and the battery unit 90, and also allows the main body unit 10 to be worn on a neck area of the user. The main body unit 10 includes a face direction detection window 13, a start switch 14, a stop switch 15, a photographing lens 16, an LED 17, and a microphone array 19. The microphone array 19 is configured to include microphones 19L, 19R, 19BL, and 19BR. The main body unit 10, mounting unit 80, and battery unit 90 compose an annular casing unit of the camera 1. In a case where the camera 1 is hung around the user's neck, this annular casing of the camera 1 is placed so as to surround the user's neck.

The face direction detection window 13 is built in the main body unit 10. In order to detect the position of each part of the user's face, the face direction detection window 13 allows infrared light projected from infrared LEDs 22 (see FIG. 5) and reflected light thereof to be transmitted therethrough.

The start switch 14 is a switch for starting shooting. The stop switch 15 is a switch for stopping shooting. The photographing lens 16 directs light rays to be shot to a solid-state image sensor 42 (see FIG. 5) inside the main body unit 10. The LED 17 is used to indicate that shooting is in progress, and to issue a warning.

The microphones 19R and 19L are microphones for obtaining environmental sounds, which are sounds around the camera 1. The microphone 19L takes in sounds on the left surrounding side of the user (the observer's right in FIG. 1A), whereas the microphone 19R takes in sounds on the right surrounding side of the user (the observer's left in FIG. 1A). The microphones 19R and 19L are, for example, non-directional microphones that use the micro-electromechanical system (MEMS) technique.

The microphones 19BR and 19BL are microphones for obtaining voices of the user, and are arranged at positions that are closer to the mouth of the user than the microphones 19R and 19L are in a state where the camera 1 is worn by the user. Furthermore, the microphones 19BR and 19BL are arranged at a predetermined distance (a second distance) from the microphones 19R and 19L in the vertical direction. The microphones 19BR and 19BL are, for example, non-directional microphones that use the micro-electromechanical system (MEMS) technique. The microphones 19BR and 19BL are arranged on opposite sides with a mouth area located therebetween, while being in a positional relationship where a line connecting the microphones 19BR and 19BL matches the direction in which the user turns their head sideways when the camera 1 is hung around the user's neck. In other words, the microphones 19BR and 19BL are placed so that a line connecting them intersects with a line connecting the mouth and nose of the user. At this time, provided that the mouth area is a sound source, the microphones 19BR and 19BL are arranged at positions on the sides of the sound source.

Also, the microphones 19BR and 19BL are arranged at a predetermined distance d (a first distance) from each other. The predetermined distance d has been set to enable obtainment of sounds in a frequency band of the sound source that is desired to be obtained. In the present embodiment, the predetermined distance d has been set to a distance with which voices of the user can be obtained when the camera 1 is hung around the user's neck. In the present embodiment, directionality is given to sound signals from these microphones 19BR and 19BL with use of the beamforming technique, as will be described later.

Figure 1B:
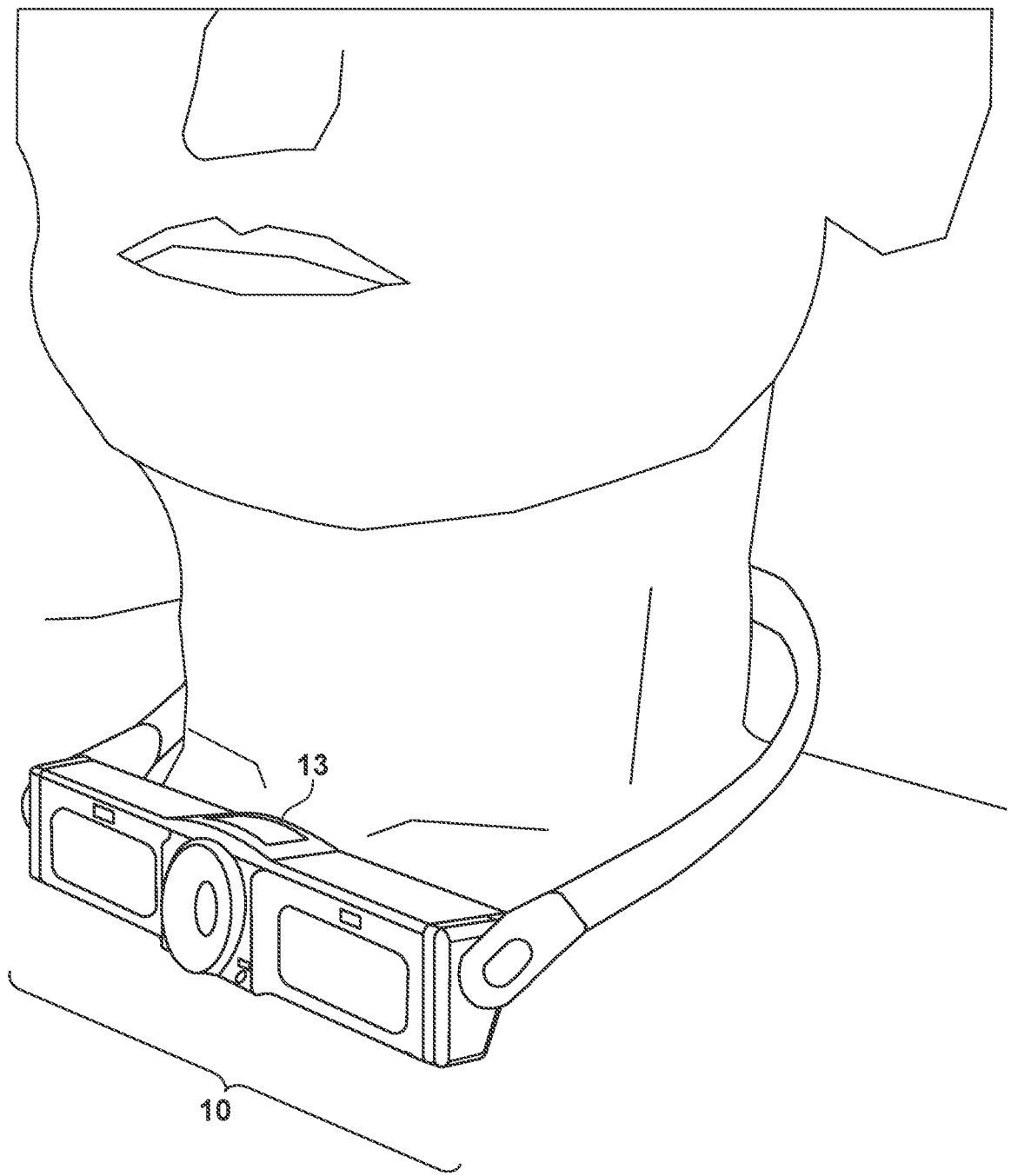
FIG. 1B is a diagram showing a state where the camera is hung around a user's neck.

FIG. 1B is a diagram showing a state where the camera 1 is hung around the user's neck.

In the camera 1, the mount unit 80 and the main body unit 10 are configured so that the user easily wears and takes off the camera 1 using a non-illustrated connection/connectioncancellation mechanism provided on both ends of the main body unit 10 on the left and right. Accordingly, the camera 1 is worn on the neck area of the user as a result of hanging the mount unit 80 around the neck area of the user in a state where the mount unit 80 has been detached from the main body unit 10 by the user, and connecting both ends of the mount unit 80 to both ends of the main body unit 10. The camera 1 is worn so that the battery unit 90 is situated on the back side of the user, and the main body unit 10 is situated on the front side of the user's body. One end of the mount unit 80 is connected to the vicinity of one of the left and right ends of the main body unit 10, and the other end of the mount unit 80 is connected to the vicinity of the other of the left and right ends of the main body unit 10. Also, the camera 1 is supported by the mount unit 80, and pushed in the direction toward the user's chest. Consequently, the main body unit 10 is located approximately in front of the collarbones of the user. At this time, the face direction detection window 13 is located below the user's chin. An infrared light collecting lens 26 shown in FIG. 2E is arranged inside the face direction detection window 13. An optical axis (a detection optical axis) of the infrared light collecting lens 26 extends in a direction different from a direction of an optical axis (an image capturing axis) of the photographing lens 16, and a later-described face direction detection unit 20 can detect the position of each part of the face and determine the direction in which the user is observing (hereinafter also referred to as an observing direction). In this way, a later-described image capture unit 40 can perform shooting in the user's observing direction. A method of adjusting the set position in accordance with individual differences in the body shape and differences in outfits, etc. will be described later.

Also, arranging the main body unit 10 in front of the body and the battery unit 90 on the back side of the body in the foregoing manner can achieve the advantageous effect of alleviating fatigue of the user through dispersion of weight, and the advantageous effect of suppressing displacement caused by, for example, a centrifugal force when the user is in motion.

Note that although the present embodiment has been described using an example in which the camera 1 is worn so that the main body unit 10 is located approximately in front of the collarbones of the user, no limitation is intended by this. The camera 1 may be worn on any location on the user's body, except for the head, as long as the face direction detection unit 20 can detect the user's observing direction and the image capture unit 40 can perform shooting in this observing direction.

Figure 1C:
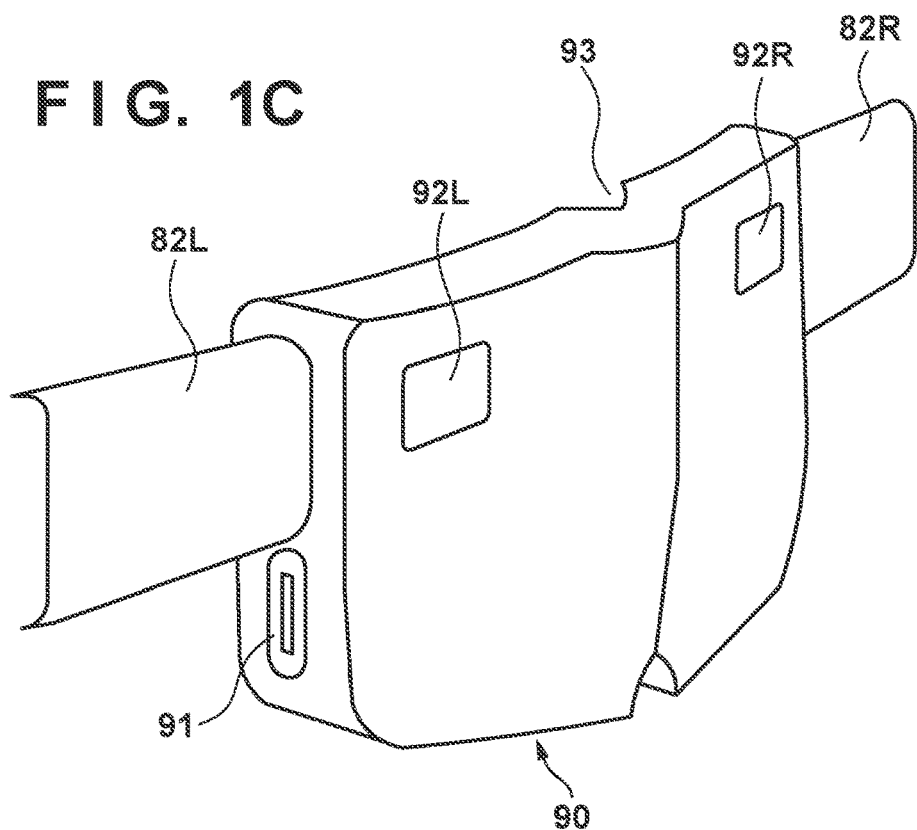
FIG. 1C is a diagram of a battery unit as viewed from behind FIG. 1A.

FIG. 1C is a diagram of the battery unit 90 as viewed from behind FIG. 1A. The battery unit 90 is used as a power supply for the camera 1, and includes a chargeable battery built therein.

In FIG. 1C, the battery unit 90 includes a charging cable socket 91, adjustment buttons 92L and 92R, and a spine avoidance slit 93.

The charging cable socket 91 is a socket into which a non-illustrated charging cable is inserted. An external power supply can charge internal batteries 94 and supply power to the main body unit 10 via the charging cable inserted into the charging cable socket 91.

The adjustment buttons 92L and 92R are buttons for adjusting the lengths of band units 82L and 82R of the mount unit 80. The adjustment button 92L is a button for adjusting the band unit 82L on the observer's left, and the adjustment button 92R is a button for adjusting the band unit 82R on the observer's right. Note that although the lengths of the band units 82L and 82R are adjusted respectively by the adjustment buttons 92L and 92R on an individual basis in the present embodiment, the lengths of the band units 82L and 82R may be simultaneously adjustable with one button. Hereinafter, the band units 82L and 82R are collectively referred to as band units 82.

The spine avoidance slit 93 is a slit for avoiding the area of the spine of the user so that the battery unit 90 does not come into contact with the area of the spine. By avoiding projections of the spine of a human body, discomfort of wearing can be alleviated, and furthermore, the camera 1 can be prevented from moving to the left or right during use.

Figure 1D:
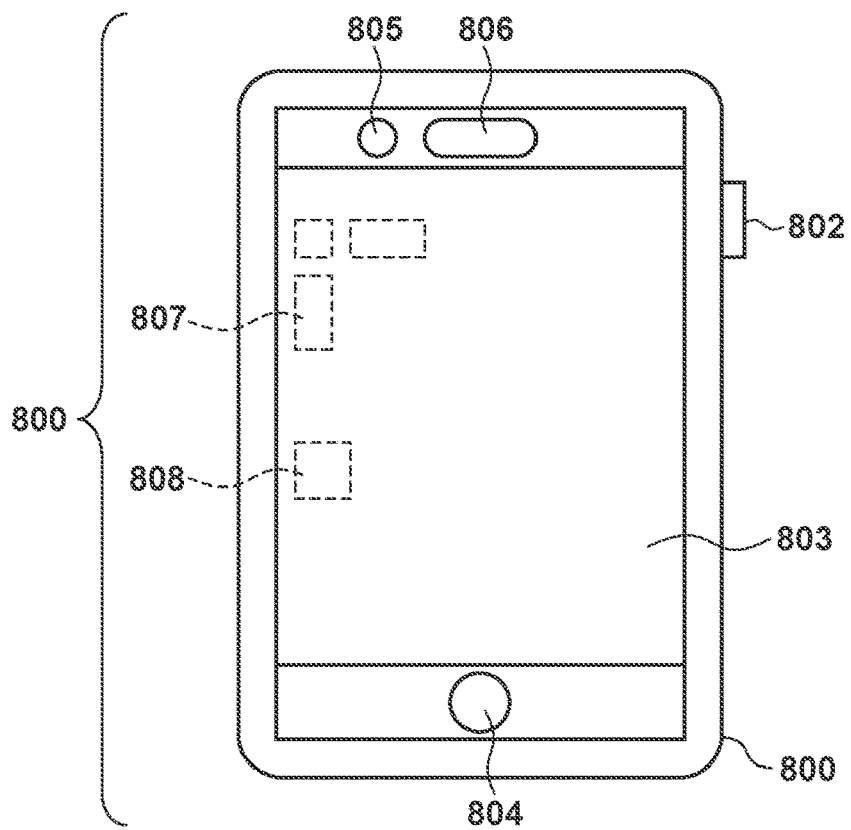
FIG. 1D is an external view of a display apparatus that is configured separately from the camera.

FIG. 1D is an external view of the display apparatus 800 as a mobile device, which is configured separately from the camera 1.

In FIG. 1D, the display apparatus 800 includes a button A 802, a display unit 803, a button B 804, a front-facing camera 805, a face sensor 806, angular velocity sensors 807, and an acceleration sensor 808. Also, a wireless LAN that enables high-speed communication with the camera 1 is included, although not shown in FIG. 1D.

The button A 802 is a button that functions as a power button of the display apparatus 800; it accepts a power on/off operation when long-pressed, and accepts instructions at other processing timings when short-pressed.

The display unit 803 displays videos shot by the camera 1, and displays menu screens necessary for settings. In the present embodiment, a transparent touch sensor is provided on a top surface of the display unit 803, and a touch operation performed on a screen that is currently displayed (e.g., a menu screen) can also be accepted.

The button B 804 functions as a calibration button 854 used in later-described calibration processing. The front-facing camera 805 is a camera capable of taking a shot of a person observing the display apparatus 800.

The face sensor 806 can detect the shape and the observing direction of the face of the person observing the display apparatus 800. Although a specific structure of the face sensor 806 is not particularly limited, it can be realized using various types of sensors such as a structured optical sensor, a ToF sensor, and a millimeter wave radar, for example.

The angular velocity sensors 807 are situated inside the display apparatus 800, and thus indicated by dash lines as meant in a perspective view. The display apparatus 800 of the present embodiment also has a later-described calibrator function; therefore, gyroscope sensors corresponding to three directions, namely X, Y, and Z, are mounted thereon. Note that the acceleration sensor 808 detects an orientation of the display apparatus 800.

A general smartphone is used as the display apparatus 800 of the present embodiment. The camera system of the present embodiment can be realized by making firmware on this smartphone compatible with firmware on the camera 1. Note that the camera system of the present embodiment can be realized also by making firmware on the camera 1 compatible with an application or an OS of the smartphone used as the display apparatus 800.

FIG. 2A to FIG. 2F are diagrams showing a configuration of the main body unit 10 in detail. In the subsequent drawings, components that have already been described are given the same reference signs, and a description thereof is omitted.

Figure 2A:
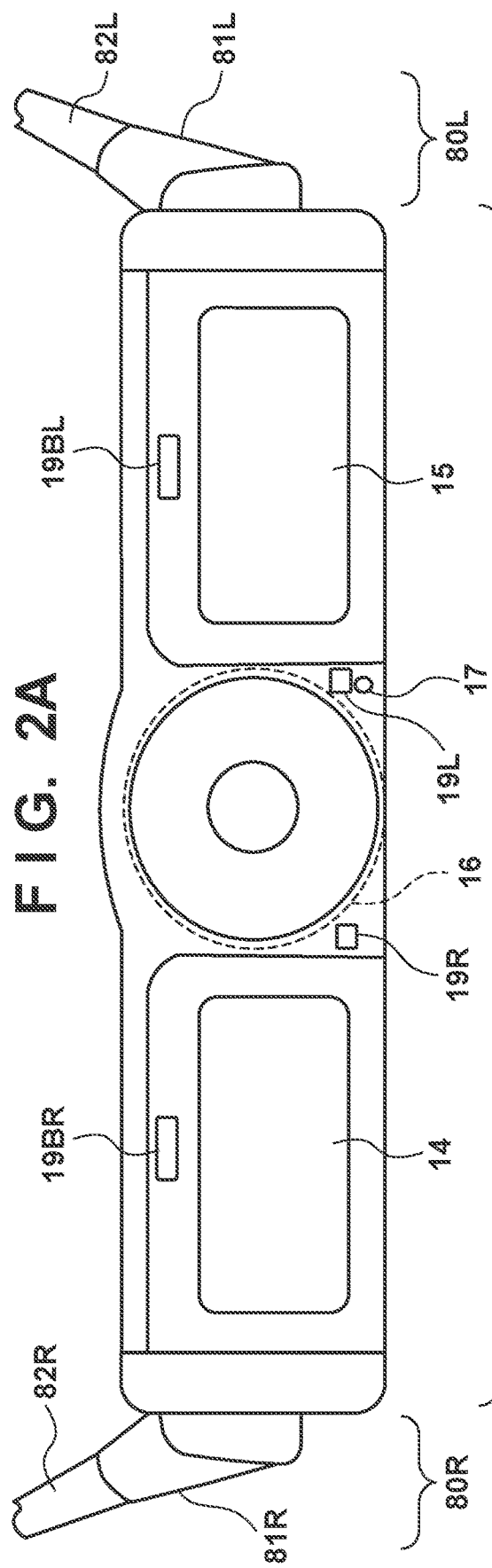
FIG. 2A is a front view of a main body unit.

FIG. 2A is a front view of the main body unit 10.

The mount unit 80 is connected to the main body unit 10 via a right connection unit 80R located on the right side of the user's body (the observer's left in FIG. 2A), and a left connection unit 80L located on the left side of the user's body (the observer's right in FIG. 2A). Specifically, the mount unit 80 is composed of angle maintaining units 81 made of a hard material for maintaining the angle with the main body unit 10, and the band units 82. The right connection unit 80R includes the angle maintaining unit 81R and the band unit 82R, and the left connection unit 80L includes the angle maintaining unit 81L and the band unit 82L.

Figure 2B:
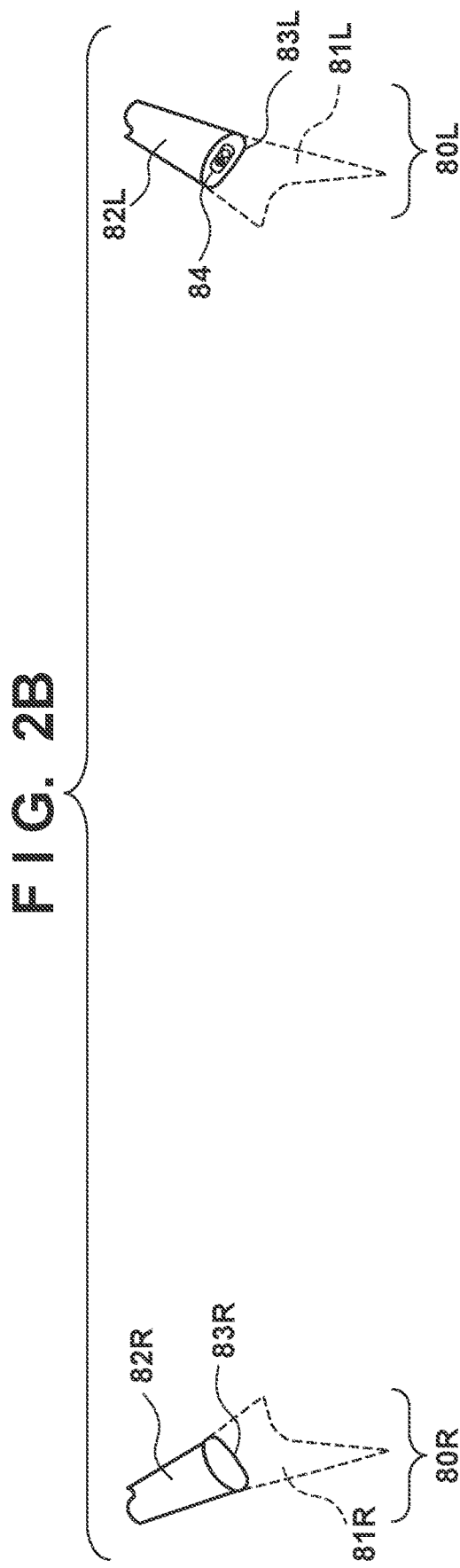
FIG. 2B is a diagram showing the shape of band units of connection units.
Figure 2E:
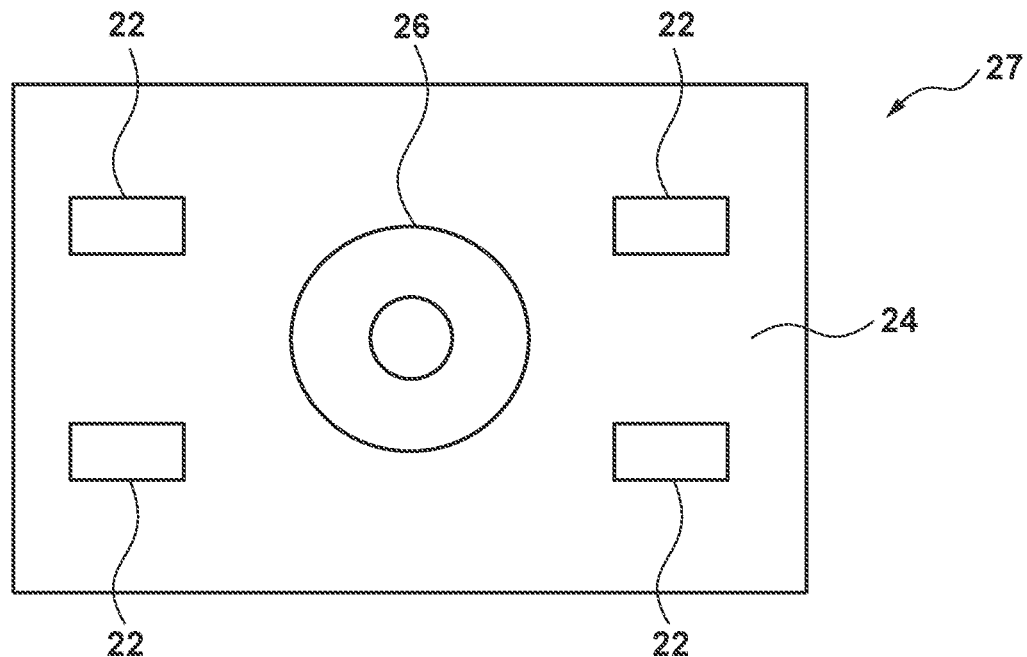
FIG. 2E is a diagram showing a configuration of an infrared detection processing apparatus that is arranged below a face direction detection window.

FIG. 2B is a diagram showing the shape of the band units 82 of the mount unit 80. In this diagram, the angle maintaining units 81 are indicated by dash lines to show the shape of the band units 82.

The band units 82 include connection surfaces 83 and an electrical cable 84. The connection surfaces 83 are surfaces where the angle maintaining units 81 and the band units 82 are connected, and have a cross-sectional shape that is not a perfect circle; here, they have an elliptic shape. Hereinafter, among the connection surfaces 83, the connection surface 83 located on the right side of the user's body (the observer's left in FIG. 2B) when the camera 1 is worn will be referred to as a right connection surface 83R, whereas the connection surface 83 located on the left side thereof (the observer's right in FIG. 2B) will be referred to as a left connection surface 83L. The right connection surface 83R and the left connection surface 83L are in a positional relationship where together they form the shape of a Japanese katakana character "ha". That is to say, the distance between the right connection surface 83R and the left connection surface 83L decreases with distance from the observer's lower side toward the observer's upper side in FIG. 2B. Consequently, when the camera 1 is hung around the user's neck, the major axis direction of the connection surfaces 83 of the mount unit 80 extends in the direction along the user's body. This achieves the advantageous effect of providing comfort when the band units 82 are in contact with the user's body, and also making it less likely for the main body unit 10 to move in the left, right, front, and back directions.

The electrical cable 84 is arranged inside the band unit 82L, and electrically connects together the battery unit 90 and the main body unit 10. The electrical cable 84 is used to supply power of the battery unit 90 to the main body unit 10, and to exchange electrical signals with the outside.

FIG. 2C is a rear view of the main body unit 10. FIG. 2C is a diagram of a view from the side that comes into contact with the user's body, that is to say, the opposite side of FIG. 2A, and thus the positional relationship between the right connection unit 80R and the left connection unit 80L therein is the reverse of that in FIG. 2A. The main body unit 10 has a power supply switch 11, a shooting mode switch 12, and chest attachment pads 18 on a back side thereof. The power switch 11 is a switch for switching between power on and off of the camera 1. Although the power switch 11 of the present embodiment is a switch in a form of a sliding lever, it is not limited thereto. For example, the power supply switch 11 may be a push-type switch, or may be a switch that is configured integrally with a non-illustrated sliding cover of the photographing lens 16.

The shooting mode switch 12 is a switch for changing a shooting mode, and can change among modes related to shooting. In the present embodiment, the shooting mode switch 12 can change the shooting mode to a still image mode, a moving image mode, and a later-described preset mode that uses the display apparatus 800. In the present embodiment, the shooting mode switch 12 is a switch in a form of a sliding lever in which the lever is slid to select one of "Photo", "Normal", and "Pri" shown in FIG. 2C. The shooting mode transitions to the still image mode when the lever has been slid to "Photo", and transitions to the moving image mode when the lever has been slid to "Normal". Also, the shooting mode transitions to the preset mode when the lever has been slid to "Pri". Note that the shooting mode switch 12 is not limited to embodiments of the present embodiment as long as it is a switch that can change the shooting mode. For example, it may be composed of three buttons corresponding to "Photo", "Normal", and "Pri".

The chest attachment pads 18 are components that come into contact with the user's body when the main body unit 10 is pushed against the user's body. As shown in FIG. 2A, the main body unit 10 is formed in such a manner that, when worn, the horizontal (left-right) total length thereof is longer than the vertical (up-down) total length thereof, and the chest attachment pads 18 are arranged in the vicinity of the left and right ends of the main body unit 10. With such an arrangement, blurring associated with leftward or rightward rotation can be suppressed during shooting performed by the camera 1. Furthermore, the presence of the chest attachment pads 18 can prevent the power supply switch 11 and the shooting mode switch 12 from touching the user's body. Moreover, the chest attachment pads 18 also play a role in preventing transmission of heat to the user's body when the temperature of the main body unit 10 has increased as a result of shooting over a long duration, and a role in adjusting the angle of the main body unit 10.

FIG. 2D is a top view of the main body unit 10.

As shown in FIG. 2D, the face direction detection window 13 is provided in a central portion of a top surface of the main body unit 10, and furthermore, the chest attachment pads 18 project from the main body unit 10.

FIG. 2E is a diagram showing a configuration of an infrared detection processing apparatus 27 that is arranged inside the main body unit 10 and below the face direction detection window 13.

The infrared detection processing apparatus 27 includes the infrared LEDs 22 and the infrared light collecting lens 26. The infrared LEDs 22 project infrared light 23 (see FIG. 5) toward the user. The infrared light collecting lens 26 forms an image of reflected light rays 25 (see FIG. 5) that have been reflected by the user following the light projection from the infrared LEDs 22 on a non-illustrated sensor (light receiving element) of the infrared detection processing apparatus 27.

Figure 2F:
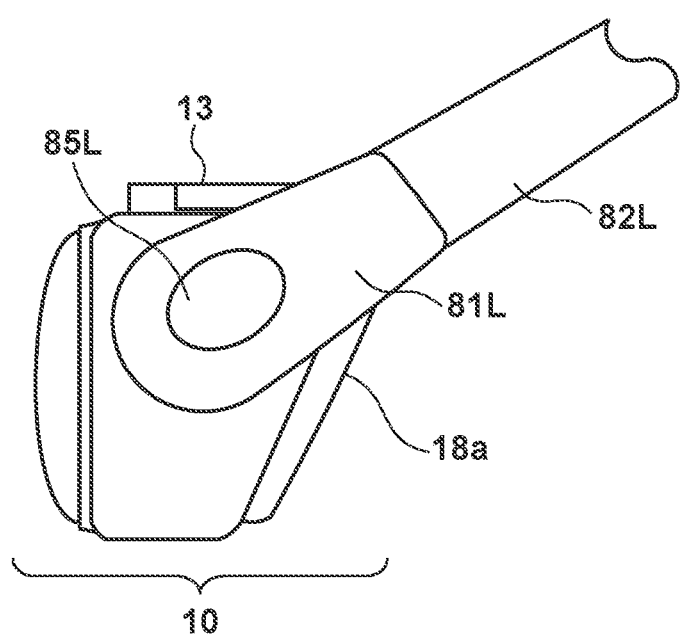
FIG. 2F is a diagram of the camera as viewed from the left side of the user.

FIG. 2F is a diagram showing a state where the camera 1 is hung around the user's neck as viewed from the left side of the user.

An angle adjustment button 85L is a button provided on the angle maintaining unit 81L, and is used to adjust the angle of the main body unit 10. Note that, although not shown in the present drawing, an angle adjustment button 85R is also arranged on the angle maintaining unit 81R, which is located on the opposite side, at a position that forms symmetry with the angle adjustment button 85L. Hereinafter, the angle adjustment buttons 85R and 85L will be referred to as angle adjustment buttons 85 when they are mentioned collectively.

Although the angle adjustment buttons 85 are located at positions that are visible also in FIG. 2A, FIG. 2C, and FIG. 2D, they are omitted therefrom for the sake of simple explanation.

The user can change the angle between the main body unit 10 and the angle maintaining units 81 by moving the angle maintaining units 81 in the up or down direction in FIG. 2F while pressing the angle adjustment buttons 85. Also, the angle of projection of the chest attachment pads 18 can be changed. In the main body unit 10, the action of these two types of angle changing members (the angle adjustment buttons 85 and the chest attachment pads 18) allows the direction of the photographing lens 16 to be adjusted to be level in accordance with individual differences in the position and shape of the chest among users.

FIGS. 3A to 3C are diagrams for describing a detailed configuration of the battery unit 90.

FIG. 3A is a partially perspective view of the battery unit 90 as viewed from a back side. As shown in FIG. 3A, two batteries, namely, the left battery 94 L and the right battery 94 R (hereinafter also referred to as batteries 94 collectively) are symmetrically arranged inside the battery unit 90 so as to keep a balance of weight of the battery unit 90. As a result of arranging the batteries 94 symmetrically with respect to a central portion of the battery unit 90 in the above-described manner, the balance of weight is kept between left and right, and positional displacement of the camera 1 is prevented. Note that the battery unit 90 may be configured in such a manner that only one battery is provided therein.

FIG. 3B is a top view of the battery unit 90. In this diagram, too, the batteries 94 are shown in a perspective manner, and a positional relationship between the spine avoidance slit 93 and the batteries 94 is clearly shown. As a result of arranging the batteries 94 symmetrically on both sides of the spine avoidance slit 93 in the above-described manner, the user can wear the battery unit 90, which is relatively heavy, without burden.

FIG. 3C is a rear view of the battery unit 90, and is a diagram thereof as viewed from the side that comes into contact with the user's body, that is to say, the opposite side of FIG. 3A. As shown in FIG. 3C, the spine avoidance slit 93 is provided at the center along the spine of the user.

FIG. 4 is a functional block diagram of the camera 1. A description is now given of a flow of rough processing executed by the camera 1 with use of FIG. 4. The details will be described later.

In FIG. 4, the camera 1 includes a face direction detection unit 20, a recording direction and angle-of-view determination unit 30, an image capture unit 40, an image cutout and development processing unit 50, a primary recording unit 60, a transmission unit 70, a sound processing unit 104, and an other control unit 111. Each of these blocks is controlled by an overall control CPU 101 (see FIG. 5) that performs overall control of the camera 1.

The face direction detection unit 20 is a functional block composed of the infrared LEDs 22, the infrared detection processing unit 27, and so forth, analogizes an observing direction by detecting the direction of the user's face, and transmits the same to the recording direction and angle-of-view determination unit 30 and the sound processing unit 104.

The recording direction and angle-of-view determination unit 30 performs various types of computation based on the observing direction of the user analogized by the face direction detection unit 20, determines information of a position and a range that are used to perform a cutout from images from the image capture unit 40, and transmits this information to the image cutout and development processing unit 50.

Based on the direction of the face analogized by the face direction detection unit 20, the sound processing unit 104 performs various types of computation with respect to input sounds so that the sounds from the mouth area of the user are emphasized.

The image capture unit 40 converts light rays from a subject into image signals, and transmits these image signals to the image cutout and development processing unit 50.

The image cutout and development processing unit 50 performs a cutout from images from the image capture unit 40 and develops the cutout result using the information from the recording direction and angle-of-view determination unit 30, and transmits only videos in the direction viewed by the user to the primary recording unit 60.

The primary recording unit 60 is a functional block composed of a primary memory 103 (see FIG. 5) and the like, records image signals, and transmits the same to the transmission unit 70 at a necessary timing.

The transmission unit 70 performs radio communication with the display apparatus 800 (see FIG. 1D), a calibrator 850, and a simple display apparatus 900 that are communication partners that have been determined in advance.

The display apparatus 800 is a display apparatus that can communicate with the transmission unit 70 via a wireless LAN that enables high-speed communication (hereinafter referred to as "high-speed radio"). Here, although the present embodiment uses radio communication compatible with the IEEE 802.11ax (Wi-Fi 6) standard as the high-speed radio, radio communication compatible with another standard, such as the Wi-Fi 4 standard and the Wi-Fi 5 standard, may be used thereas. Also, the display apparatus 800 may be a device that has been developed exclusively for the camera 1, or may be a general smartphone, tablet terminal, or the like.

Note that in communication between the transmission unit 70 and the display apparatus 800, low-power radio may be used, both of the high-speed radio and low-power radio may be used, or they may be used in alternation. In the present embodiment, high-volume data such as video files of videos composed of moving images, which will be described later, is transmitted over the high-speed radio, whereas low-volume data and data that can be transmitted over a long period of time are transmitted over the low-power radio. Here, although the present embodiment uses Bluetooth as the low-power radio, another close-range (short-range) radio communication, such as near-field communication (NFC), may be used thereas.

The calibrator 850 is a device that configures initial settings and personalized settings for the camera 1, and is a device that can communicate with the transmission unit 70 over the high-speed radio, similarly to the display apparatus 800. The details of the calibrator 850 will be described later. Furthermore, the display apparatus 800 may additionally have the functions of this calibrator 850.

The simple display apparatus 900 is, for example, a display apparatus that can communicate with the transmission unit 70 only over the low-power radio. The simple display apparatus 900 is a display apparatus that cannot exchange videos composed of moving images with the transmission unit 70 due to temporal constraints, but can exchange timing signals for starting and stopping shooting, exchange images that are simply intended for confirmation of the composition, etc. Furthermore, the simple display apparatus 900 may be a device that has been developed exclusively for the camera 1, similarly to the display apparatus 800, or may be a smartwatch or the like.

Figure 5:
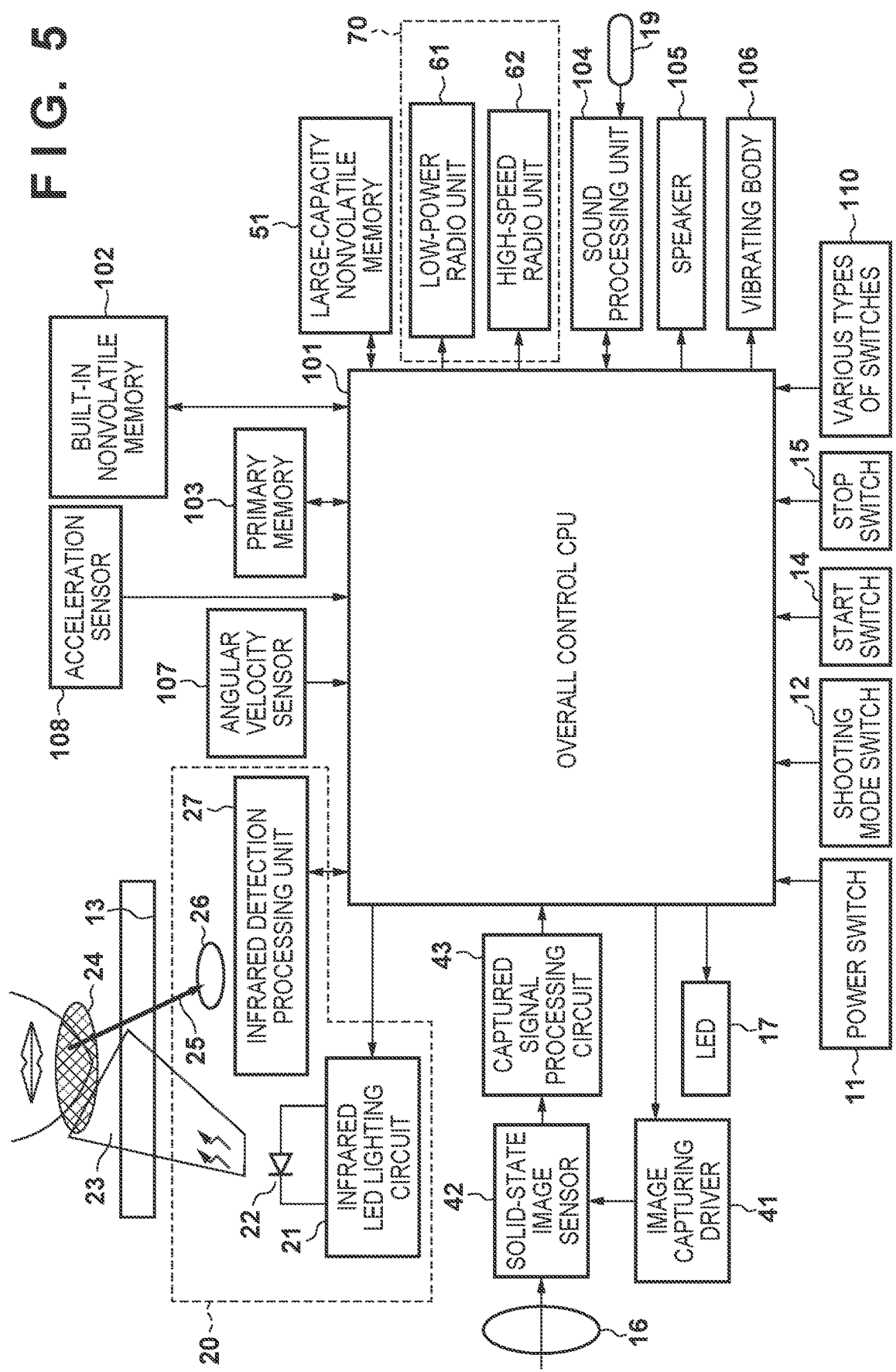
FIG. 5 is a block diagram showing a hardware configuration of the camera.

FIG. 5 is a block diagram showing a hardware configuration of the camera 1. Note that the constituents and functions that have been described using FIG. 1A to FIG. 1C and the like are given the same reference signs, and a detailed description thereof is omitted.

In FIG. 5, the camera 1 includes the overall control CPU 101, the power switch 11, the shooting mode switch 12, the face direction detection window 13, the start switch 14, the stop switch 15, the photographing lens 16, and the LED 17.

The camera 1 also includes an infrared LED lighting circuit 21, the infrared LEDs (infrared light-emitting diodes) 22, the infrared light collecting lens 26, and the infrared detection processing apparatus 27 that compose the face direction detection unit 20 (see FIG. 4).

Furthermore, the camera 1 includes the image capture unit 40 (see FIG. 4) composed of image capturing driver 41, the solid-state image sensor 42, and a captured signal processing circuit 43, and the transmission unit 70 (see FIG. 4) composed of a low-power radio unit 61 and a high-speed radio unit 62.

Note that although the camera 1 includes only one image capture unit 40 in the present embodiment, it may include two or more image capture units 40. Providing a plurality of image capturing units also enables shooting of 3D videos, shooting of videos with the angle of view wider than the angle of view that can be achieved using one image capture unit 40, shooting in a plurality of directions, and so forth.

The camera 1 also includes various types of memories such as a large-capacity nonvolatile memory 51, a built-in nonvolatile memory 102, and the primary memory 103.

Moreover, the camera 1 includes the sound processing unit 104, a speaker 105, a vibrating body 106, an angular velocity sensor 107, an acceleration sensor 108, and various types of switches 110.

The overall control CPU 101 controls the entirety of the camera 1. The recording direction and angle-of-view determination unit 30, the image cutout and development processing unit 50, and the other control unit 111 shown in FIG. 4 are realized by the overall control CPU 101 executing a program stored in, for example, the primary memory 103. Also, the overall control CPU 101 uses the sound processing unit 104 to perform voice recognition for detecting voice commands from sound signals. Voice commands are not limited to commands that have been registered in advance, and the user may be able to register specific voices thereas with the camera 1. Furthermore, in voice recognition, voice commands are determined using a network that has been trained in advance by machine learning based on a large volume of voice data. For example, voice commands for controlling the camera 1, such as "start shooting" and "stop shooting" have been registered with the overall control CPU 101. Then, when the overall control CPU 101 has detected a specific voice command, each function of the camera 1 is controlled so that a camera operation corresponding to the voice command is performed.

The infrared LED lighting circuit 21 controls the infrared LEDs 22 shown in FIG. 2E to be turned on and turned off, thereby controlling the projection of infrared light 23 from the infrared LEDs 22 toward the user. The face direction detection window 13 is composed of a visible light cutoff filter; it hardly allows visible light rays to be transmitted therethrough, but allows infrared light 23 and reflected light rays 25 thereof, which are light in the infrared region, to be transmitted therethrough. The infrared light collecting lens 26 is a lens that collects the reflected light rays 25.

The infrared detection processing unit 27 includes a sensor that detects the reflected light rays 25 collected by the infrared light collecting lens 26. This sensor converts the reflected light rays 25, which have been collected by the infrared light collecting lens 26 to form an image thereof, into sensor data by way of photoelectric conversion, and transmits the sensor data of one frame to the overall control CPU 101. The infrared detection processing unit outputs the sensor data of respective frame at a predetermined frame rate.

As shown in FIG. 1B, when the camera 1 is hung around the user's neck, the face direction detection window 13 is located below the user's chin. Therefore, as shown in FIG. 5, the infrared light 23 projected from the infrared LEDs 22 is transmitted through the face direction detection window 13 and irradiates an infrared light irradiation surface 24, which is a skin surface in the vicinity of the user's chin. The infrared light 23 that has been reflected off the infrared light irradiation surface 24 is transmitted through the face direction detection window 13 as the reflected light rays 25, and collected toward the sensor inside the infrared detection processing unit 27 via the infrared light collecting lens 26.

The various types of switches 110 are not shown in FIG. 1A to FIG. 1C and the like. These switches are switches for executing the functions that are not directly related to the present embodiment.

The image capturing driver 41 includes a timing generator and the like, and generates various types of timing signals. It also controls shooting operations by outputting the timing signals to respective units related to image capturing. The solid-state image sensor 42 photoelectrically converts a subject image formed by the photographing lens 16 shown in FIG. 1A, and outputs the resultant video signals to the captured signal processing circuit 43. The captured signal processing circuit 43 generates shooting data by executing clamp processing, A/D conversion processing, and the like with respect to the signals from the solid-state image sensor 42, and outputs the shooting data to the overall control CPU 101.

A flash memory or the like is used as the built-in nonvolatile memory 102; an activation program for the overall control CPU 101 and setting values of various types of program modes are stored therein. In the camera 1 of the present embodiment, alteration of the field of view for observation (the angle of view) and the effective level of anti-vibration control can be set, and thus setting values therefor are also recorded in the built-in nonvolatile memory 102.

The primary memory 103 is composed of a RAM or the like; it temporarily stores image data that is currently processed, and temporarily stores the results of computation performed by the overall control CPU 101. The large-capacity nonvolatile memory 51 is used in recording or readout of primary image data. Although the large-capacity nonvolatile memory 51 is described as a semiconductor memory that does not have a removable/attachable mechanism in the present embodiment to facilitate the understanding of explanation, no limitation is intended by this. For example, the large-capacity nonvolatile memory 51 may be composed of a removable/attachable recording medium, such as an SD card, or may be used in combination with the built-in nonvolatile memory 102.

The low-power radio unit 61 performs data communication with the display apparatus 800, the calibrator 850, and the simple display apparatus 900 over the low-power radio. The high-speed radio unit 62 performs data communication with the display apparatus 800, the calibrator 850, and the simple display apparatus 900 over the high-speed radio.

The sound processing unit 104 processes sound signals obtained by the microphone array 19. The microphone array 19 includes the above-described microphones 19L, 19R, 19BL, and 19BR.

Figure 6:
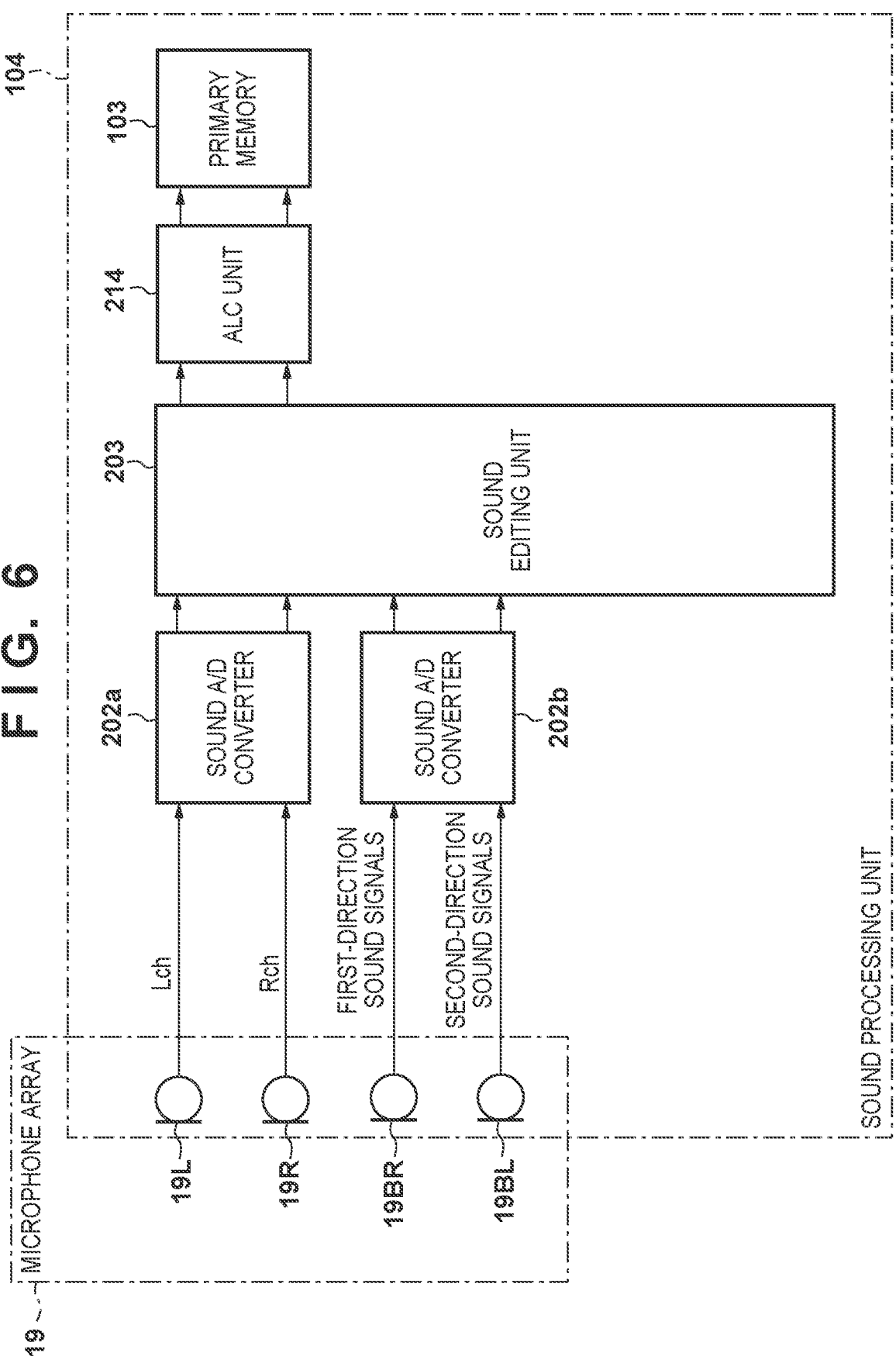
FIG. 6 is a block diagram showing a hardware configuration of a sound processing unit.

FIG. 6 is a diagram showing a configuration of major components of the microphone array 19 and the sound processing unit 104. Sound signals obtained by the microphone 19L and sound signals obtained by the microphone 19R, which are respectively regarded as Lch sound signals and Rch sound signals, are converted from analog signals to digital signals in a sound A/D converter 202*a*. A certain amount of gain is applied before the A/D conversion so as to achieve a desired level in accordance with microphone sensitivity, and then the A/D conversion is performed. For example, a programmable-gain amplifier (PGA) can be used as means for applying a gain. Note that although there are a variety of A/D conversion methods, delta-sigma A/D conversion is often used for sound signals.

A sound editing unit 203 applies noise reduction processing, wind noise reduction processing, stereo enhancement processing, and filter processing associated with a predetermined frequency to the Lch sound signals and the Rch sound signals. The processed Lch sound signals and Rch sound signals are adjusted by an auto level control (ALC) unit 214 so that they reach a level without clipping even in a case where an excessively loud sound has been input, and then stored into the primary memory 103. Sound signals that has been obtained at a predetermined sampling period and stored into the primary memory 103 is stored and recorded into one file, together with moving images, as voices related to recorded moving images during the continuation of recording of moving images by the camera 1. The moving image file is stored into the large-capacity nonvolatile memory 51.

Sound signals obtained by the microphone 19BR and sound signals obtained by the microphone 19BL, which are respectively regarded as first-direction sound signals and second-direction sound signals, are converted from analog signals to digital signals in a sound A/D converter 202*b*. The sound editing unit 203 controls the directionalities of the first-direction sound signals and the second-direction sound signals based on the output result of the face direction detection unit 20. In the present embodiment, directionality is controlled using the beamforming technique. The sound editing unit 203 applies, for example, a phase-changing filter corresponding to the angle to be enhanced to first-direction sounds and second-direction sounds, and then adds or subtracts each signal, thereby enhancing sounds arriving from the angle to be enhanced; as a result, directional sound signals that have directionality are generated. The ALC unit 214 adjusts the directional sound signals so that they reach a level without clipping even in a case where an excessively loud sound has been input, and stores them into the primary memory 103. Directional sound signals stored in the primary memory 103 is used by the overall control CPU 101 in voice recognition.

In order to favorably obtain the user's voices, the present embodiment performs control so that the directionalities of sounds obtained by the microphone 19BR and the microphone 19BL are in the direction toward the user's mouth detected by the face direction detection unit 20.

The LED 17, the speaker 105, and the vibrating body 106 notify the user of a status of the camera 1 and issue a warning by emitting light, producing a sound, and producing vibration.

The angular velocity sensor 107 is a sensor that uses a gyroscope or the like, and detects a movement of the camera 1 itself. The acceleration sensor 108 detects an orientation of the main body unit 10. Note that the angular velocity sensor 107 and the acceleration sensor 108 are built in the main body unit 10; the angular velocity sensors 807 and the acceleration sensor 808 that are separate therefrom are also provided inside the later-described display apparatus 800.

Figure 7:
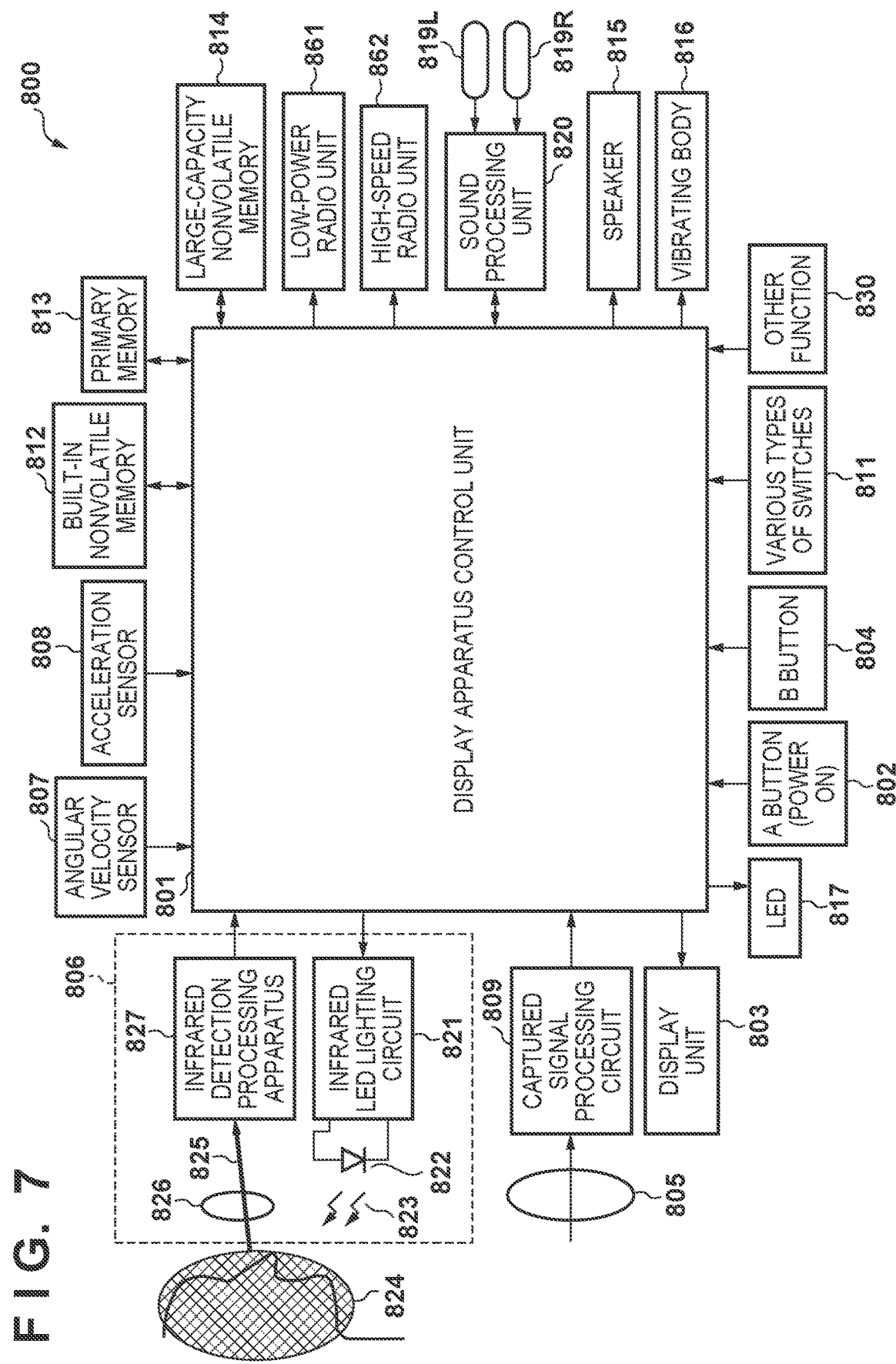
FIG. 7 is a block diagram showing a hardware configuration of the display apparatus.

FIG. 7 is a block diagram showing a hardware configuration of the display apparatus 800. Note that the parts that have been described using FIG. 1D are given the same reference signs, and a description thereof is omitted. In FIG. 7, the display apparatus 800 includes a display apparatus control unit 801, the button A 802, the display unit 803, the button B 804, the front-facing camera 805, the face sensor 806, the angular velocity sensors 807, the acceleration sensor 808, a captured signal processing circuit 809, and various types of switches 811.

Also, the display apparatus 800 includes a built-in nonvolatile memory 812, a primary memory 813, a large-capacity nonvolatile memory 814, a speaker 815, a vibrating body 816, an LED 817, a sound processing unit 820, a low-power radio unit 861, and a high-speed radio unit 862.

The display apparatus control unit 801 is composed of a CPU, and controls the entirety of the display apparatus 800.

The captured signal processing circuit 809 bears functions equivalent to those of the image capturing driver 41, the solid-state image sensor 42, and the captured signal processing circuit 43 inside the camera 1; however, as these are not directly related to the contents of the present embodiment, they are collectively illustrated as one. Data output from the captured signal processing circuit 809 is processed inside the display apparatus control unit 801.

The various types of switches 811 are not shown in FIG. 1D. These switches are switches for executing the functions that are not directly related to the present embodiment.

The angular velocity sensor 807 is a sensor that uses a gyroscope or the like, and detects a movement of the display apparatus 800. The acceleration sensor 808 detects an orientation of the display apparatus 800.

Note that as stated earlier, the angular velocity sensor 807 and the acceleration sensor 808 are built in the display apparatus 800, and although they have functions similar to those of the angular velocity sensor 107 and the acceleration sensor 108 built in the above-described camera 1, they are separate therefrom.

A flash memory or the like is used as the built-in nonvolatile memory 812; an activation program for the display apparatus control unit 801 and setting values of various types of program modes are stored therein.

The primary memory 813 is composed of a RAM or the like; it temporarily stores video data that is currently processed, and temporarily stores the results of computation performed by the captured signal processing circuit 809. In the present embodiment, during recording of videos composed of moving images, gyroscope data that is detected by the angular velocity sensor 107 at the shooting time of each frame is held in the primary memory 813 in association with each frame.

The large-capacity nonvolatile memory 814 is used in recording or readout of image data in the display apparatus 800. In the present embodiment, the large-capacity nonvolatile memory 814 is composed of a removable/attachable memory such as an SD card. Note that it may be composed of a memory that is not removable/attachable, such as the large-capacity nonvolatile memory 51 in the camera 1.

The speaker 815, the vibrating body 816, and the LED 817 notify the user of a status of the display apparatus 800 and issue a warning by producing a sound, producing vibration, and emitting light.

The sound processing unit 820 includes a left microphone 819L and a right microphone 819R for picking up external sounds (analog signals), and generates sound signals by processing the analog signals that have been picked up.

The low-power radio unit 871 performs data communication with the camera 1 over the low-power radio. The high-speed radio unit 872 performs data communication with the camera 1 over the high-speed radio.

The face sensor 806 includes an infrared LED lighting circuit 821, an infrared LED 822, an infrared light collecting lens 826, and an infrared detection processing apparatus 827. The infrared LED lighting circuit 821 is a circuit that has functions similar to those of the infrared LED lighting circuit 21 of FIG. 5, and controls the infrared LED 822 to be turned on and turned off, thereby controlling the projection of infrared light 823 from the infrared LED 822 toward the user. The infrared light collecting lens 826 is a lens that collects reflected light rays 825 of the infrared light 823. The infrared detection processing apparatus 827 includes a sensor that detects the reflected light rays collected by the infrared light collecting lens 826. This sensor converts the reflected light rays 825 that have been collected into sensor data by way of photoelectric conversion, and transmits the sensor data to the display apparatus control unit 801.

When the face sensor 806 shown in FIG. 1D is pointed at the user, the infrared light 823 projected by the infrared LED 822 irradiates an infrared light irradiation surface 824, which is the entirety of the face of the user, as shown in FIG. 7. The infrared light 823 reflected off the infrared light irradiation surface 824 is collected as the reflected light rays 825 toward the sensor inside the infrared detection processing apparatus 827 via the infrared light collecting lens 826.

An other function unit 830 executes functions which are not directly related to the present embodiment and which are unique to a smartphone, such as a telephone function and other sensor functions.

The following describes how to use the camera 1 and the display apparatus 800.

Figure 8A:
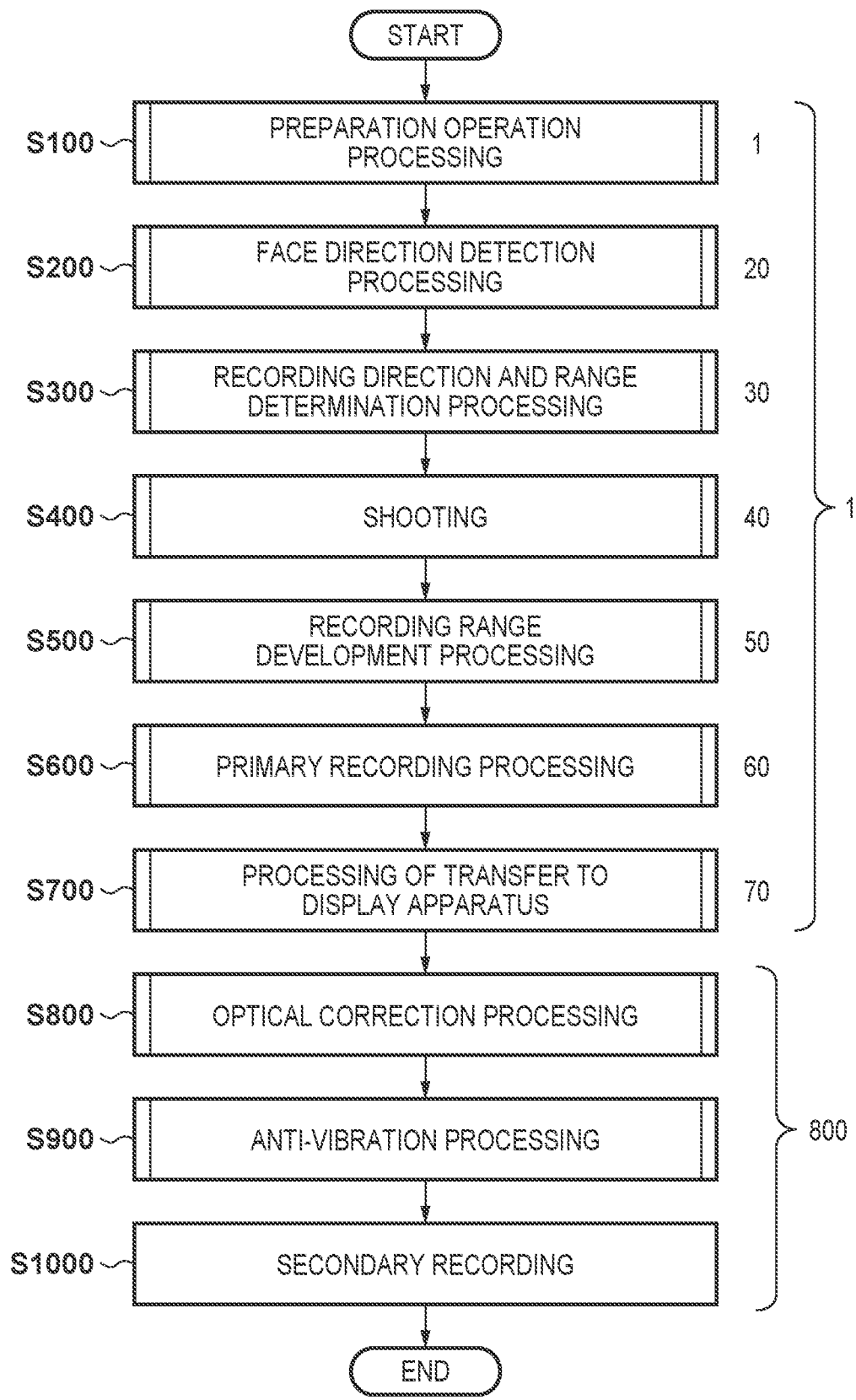
FIG. 8A is a flowchart showing an outline of shooting recording processing.

FIG. 8A is a flowchart showing an outline of shooting recording processing executed on the camera 1 and the display apparatus 800.

As a supplement to the description, FIG. 8A illustrates which one of the devices shown in FIG. 4 executes each step on the right side of that step. That is to say, steps S100 to S700 of FIG. 8A are executed on the camera 1, whereas steps S800 to S1000 of FIG. 8A are executed on the display apparatus 800.

In step S100, when the power of the camera 1 is turned on by turning the power switch 11 on, the overall control CPU 101 is activated, and the overall control CPU 101 reads out an activation program from the built-in nonvolatile memory 102. Thereafter, the overall control CPU 101 executes preparation operation processing for configuring settings before shooting by the camera 1. The details of the preparation operation processing will be described later using FIG. 8B.

In step S200, as a result of detection of a face direction by the face direction detection unit 20, face direction detection processing for analogizing the observing direction of the user is executed. The details of the face direction detection processing will be described later using FIG. 8C. This processing is executed at the predetermined frame rate at which the sensor data from the infrared detection processing unit obtains the sensor data of each frame.

In step S300, the recording direction and angle-of-view determination unit 30 executes recording direction and range determination processing. In the recording direction and range determination processing, a super-wide-angle video is obtained as a result of the image capture unit 40 shooting the surrounding of the main body unit 10 using the super-wide-angle photographing lens 16, and a part of this video is cut out to obtain a video in the observing direction. Note that processing of step S200 and processing of step S300 are executed repeatedly in a state where the power of the camera 1 is on. Also, processing of step S200 and processing of step S300 may be executed repeatedly between when shooting by the image capture unit 40 is started by operating the start button 14 and when the shooting is stopped by operating the stop button 15, and processing of step S200 and processing of step S300 may not be executed in other periods.

Processing transitions to step S400 when the user has issued an instruction to start shooting, and the image capture unit 40 performs shooting and generates shooting data in step S400.

In step S500, the image cutout and development processing unit 50 executes recording range development processing in which an image is cut out from the captured image data generated in step S400 with use of information of the recording direction and the angle of view determined in step S300, and processing for developing this range is executed.

In step S600, primary recording processing is executed in which the primary recording unit 60 stores the video developed in step S500 as video data into the primary memory 103.

In step S700, processing of transfer to a display apparatus is executed in which the transmission unit 70 performs radio transmission of the image that has been primarily recorded in step S600 to the display apparatus 800 at a designated timing.

Step S800 and subsequent steps are executed on the display apparatus 800.

In step S800, the display apparatus control unit 801 executes optical correction processing for performing optical correction with respect to the image video that has been transferred from the camera 1 in step S700.

In step S900, the display apparatus control unit 801 executes anti-vibration processing with respect to the video for which the optical correction has been performed in step S800.

Note that the order of step S800 and step S900 may be reversed. That is to say, the anti-vibration processing for the image may be executed first, and the optical correction may be performed later.

In step S1000, the display apparatus control unit 801 performs secondary recording that records the image for which the optical correction processing and the anti-vibration processing have been executed in steps S800 and S900 into the large-capacity nonvolatile memory 814, and the present processing is ended.

Next, a subroutine of each step described in FIG. 8A will be described in detail using FIG. 8B to FIG. 8D in combination with other figures.

Figure 8B:
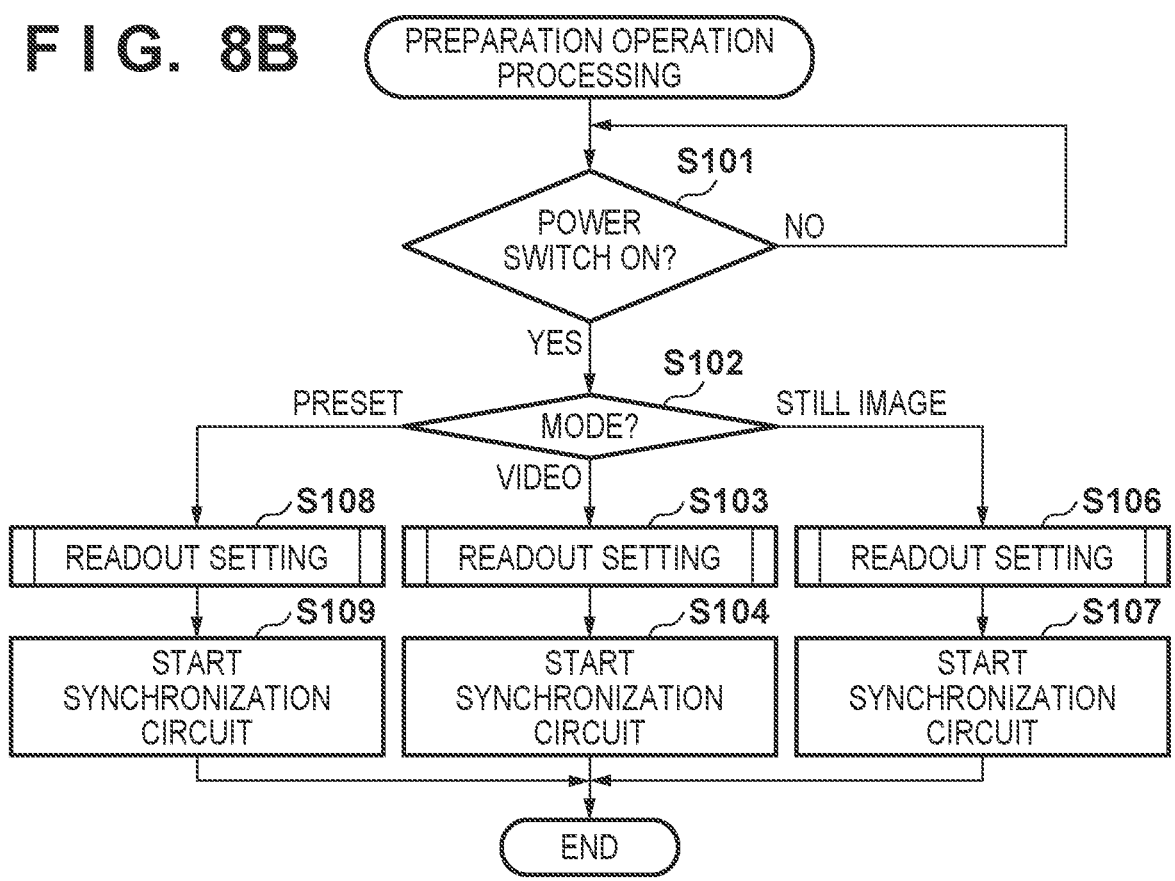
FIG. 8B is a flowchart of preparation operation processing in step S100 of FIG. 8A.

FIG. 8B is a flowchart of a subroutine of the preparation operation processing in step S100 of FIG. 8A. Below, the present processing will be described also with reference to FIGS. 2A to 2F and FIG. 5.

In step S101, the overall control CPU 101 determines whether the power switch 11 is on. It stands by when the power remains off, and proceeds to step S102 when the power is turned on.

In step S102, the overall control CPU 101 determines a mode that is selected by the shooting mode switch 12. In a case where the mode selected by the shooting mode switch 12 is the moving image mode as a result of the determination, processing proceeds to step S103.

In step S103, the overall control CPU 101 reads out various types of settings for the moving image mode from the built-in nonvolatile memory 102, stores them into the primary memory 103, and then proceeds to step S104. Here, the various types of settings for the moving image mode include a setting value ang for the angle of view (which is preset to 90° in the present embodiment), and an anti-vibration level designated by "high", "medium", "off", etc.

In step S104, the overall control CPU 101 starts operations of the image capturing driver 41 for the moving image mode, and then exits from the present subroutine.

In a case where the mode selected by the shooting mode switch 12 is the still image mode as a result of the determination in step S102, processing proceeds to step S106.

In step S106, the overall control CPU 101 reads out various types of settings for the still image mode from the built-in nonvolatile memory 102, stores them into the primary memory 103, and then proceeds to step S107. Here, the various types of settings for the still image mode include a setting value ang for the angle of view (which is preset to 45° in the present embodiment), and an anti-vibration level designated by "high", "medium", "off", etc.

In step S107, the overall control CPU 101 starts operations of the image capturing driver 41 for the still image mode, and then exits from the present subroutine.

In a case where the mode selected by the shooting mode switch 12 is the preset mode as a result of the determination in step S102, processing proceeds to step S108. Here, the preset mode is a mode in which an external device such as the display apparatus 800 sets a shooting mode with respect to the camera 1, and is one of the three shooting modes among which the shooting mode switch 12 can switch. Specifically, the preset mode is a mode for custom shooting. Here, as the camera 1 is a small wearable device, the camera 1 is not provided with operation switches, a setting screen, and the like for changing the detailed settings therefor, and the detailed settings for the camera 1 are changed using an external device such as the display apparatus 800.

For example, assume a case where an angle of view of 90° and an angle of view of 110° are desired to be shot continuously in the same moving image shooting. An angle of view of 90° is set in the normal moving image mode; therefore, in order to perform the aforementioned shooting, the following manipulation is required: first, perform shooting in the normal moving image mode, and thereafter, stop the shooting, and switch the display apparatus 800 to a setting screen for the camera 1 to change the angle of view to 110°. However, manipulating the display apparatus 800 is troublesome during some sort of event.

On the other hand, if the preset mode is set in advance as a mode that shoots moving images with an angle of view of 110°, simply sliding the shooting mode switch 12 to "Pri" after the shooting of moving images with an angle of view of 90° is ended can promptly switch to the shooting of moving images with an angle of view of 110°. That is to say, the user no longer needs to suspend the current action and perform the troublesome manipulation mentioned above.

Note that the contents set in the preset mode may include not only the angle of view, but also an anti-vibration level designated by "high", "medium", "off", etc., settings for voice recognition, and so forth.

In step S108, the overall control CPU 101 reads out various types of settings for the preset mode from the built-in nonvolatile memory 102, stores them into the primary memory 103, and then proceeds to step S109. Here, the various types of settings for the preset mode include a setting value ang for the angle of view, and an anti-vibration level designated by "high", "medium", "off", etc.

In step S109, the overall control CPU 101 starts operations of the image capturing driver 41 for the preset mode, and then exits from the present subroutine.

Figure 9A:
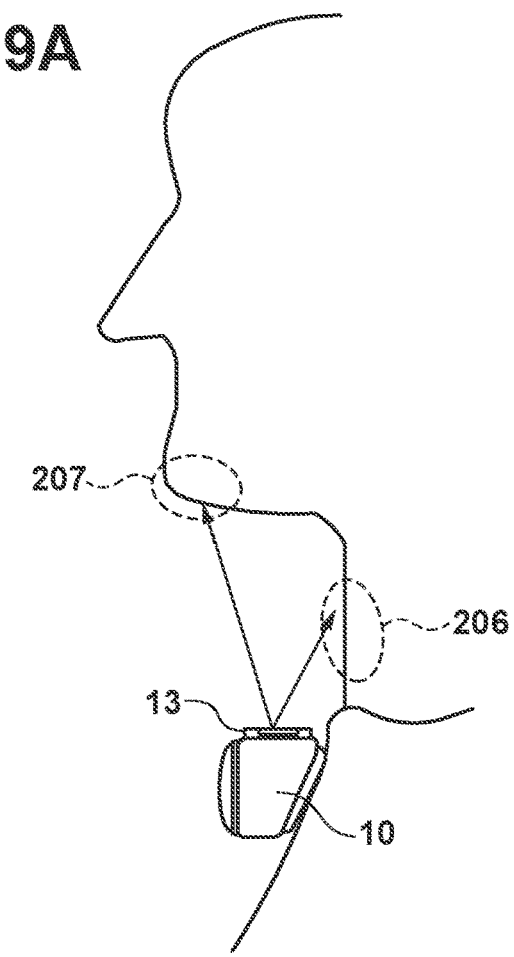
FIG. 9A is a conceptual diagram for describing a method of detecting a face direction.
Figure 9B:
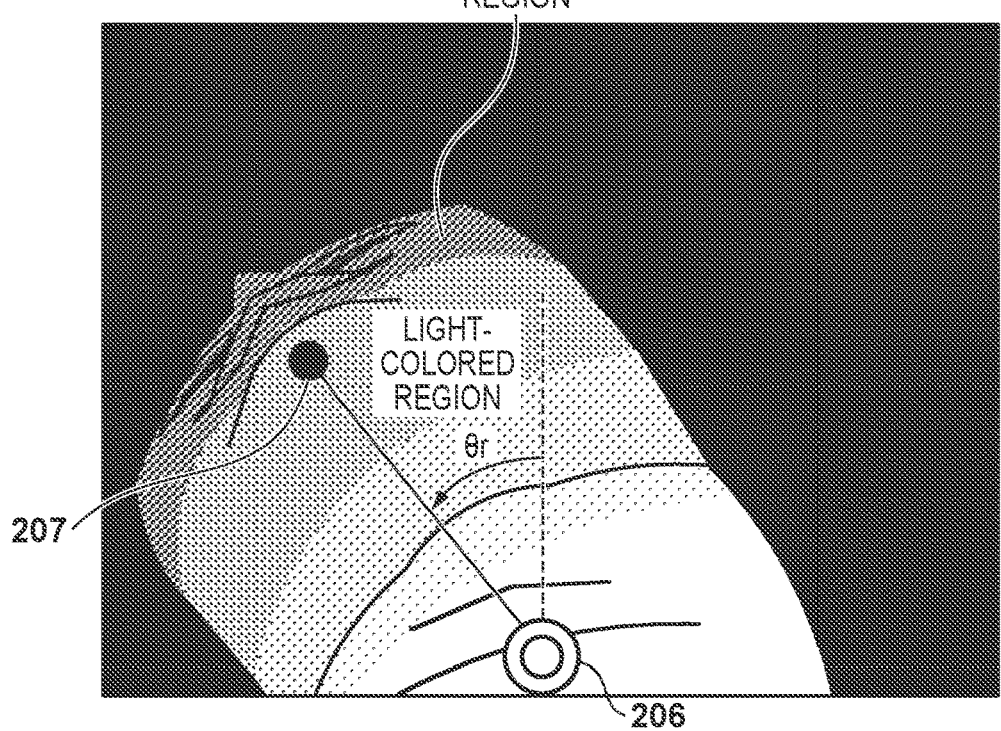
FIG. 9B is a conceptual diagram for describing a method of detecting a face direction.
Figure 9C:
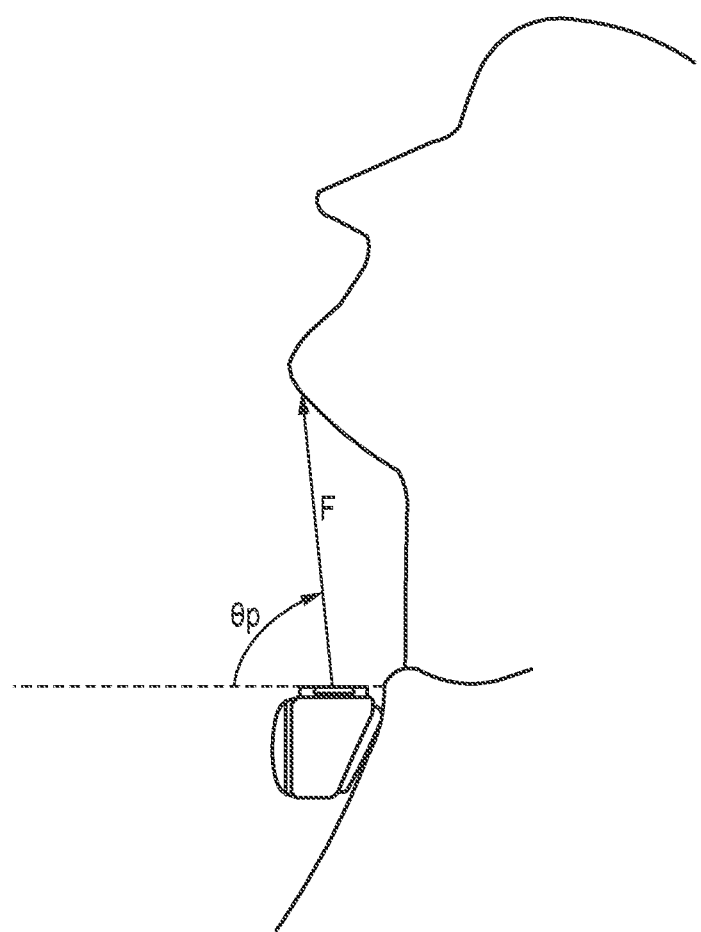
FIG. 9C is a conceptual diagram for describing a method of detecting a face direction.

The face direction detection processing in step S200 is now described using FIG. 9A to FIG. 9C. FIG. 9A to FIG. 9C are conceptual diagrams showing a method of detecting a face direction.

FIG. 9A shows a configuration relating to detection of a face direction. When the user is wearing the camera 1 around their neck, the face direction detection window 13 is located below the user's chin as shown in FIG. 9A. The face direction detection unit 20 of FIG. 4 irradiates a lower part of the user's chin with infrared light from the infrared LEDs 22 via the face direction detection window 13. The infrared detection processing unit 27 in the face direction detection unit 20 obtains image data from the chin of the user's face to the bottom of the neck of the user. Then, the face direction detection unit 20 executes binarization and edge extraction processing with respect to the obtained image as shown in FIG. 9B.

Once the user has worn the camera 1 and the above-described binarization and edge extraction processing for the image has been executed, the face direction detection unit 20 determines a dark-colored projection of an edge to be a position 207 of the tip of the chin, and determines a light-colored point near the central portion of the face direction detection window 13 to be a position 206 of the bottom of the neck.

Thereafter, the face direction detection unit 20 calculates a distance between the position 207 of the tip of the chin and the position 206 of the bottom of the neck, and calculates θr, which is a face direction angle, based on chronological amounts of displacement. Here, the face direction angle θr is an angle formed when a person has turned their head, provided that a state where the user is facing front while wearing the camera 1 is 0°.

Also, the face direction detection unit 20 calculates a chin tip distance F from the face direction detection window 13 to the tip of the chin (FIG. 9C) by calculating the distribution percentages in a dark-colored region to a light-colored region from the position 207 of the tip of the chin to the position 206 of the bottom of the neck. Furthermore, the face direction detection unit 20 calculates a face raising angle θp from chronological amounts of change in the chin tip distance F. Here, the face raising angle θp is an angle by which a person has tilted their neck forward or backward (FIG. 9C), provided that a state where the user is facing front while wearing the camera 1 is 0°.

Note that the face direction detection processing of step S200 is executed repeatedly on a continuous basis from then on until the power of the camera 1 is turned off. In addition, the sound processing unit 104 also executes processing for obtaining the user's voices and detecting voice commands along with the face direction detection processing of step S200.

Figure 8C:
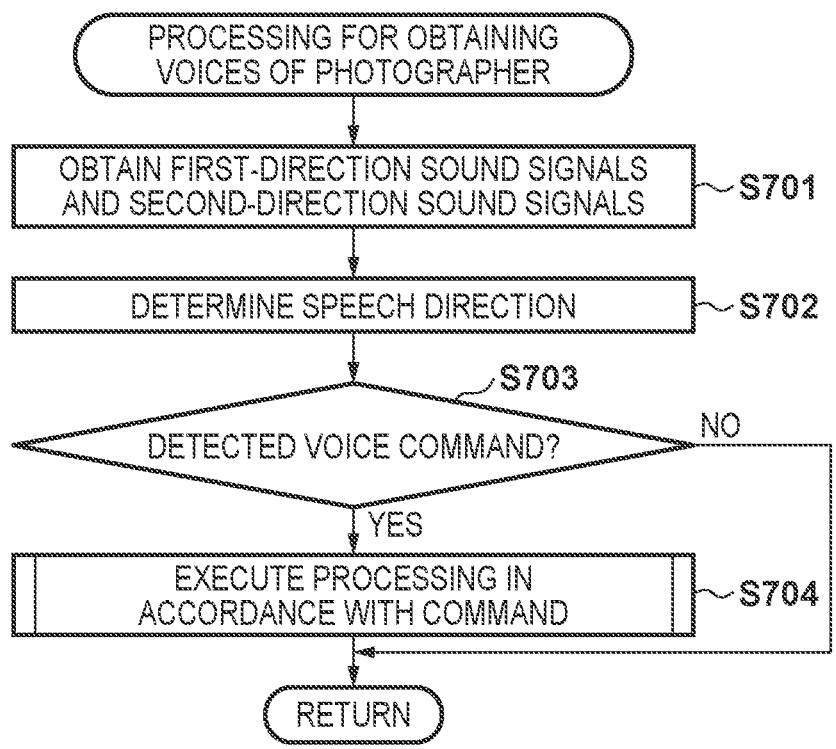
FIG. 8C is a flowchart for describing processing for obtaining voices of a photographer.

FIG. 8C is a flowchart showing the processing for obtaining the user's voices and detecting voice commands. Processing of FIG. 8C is executed by the overall control CPU 101 controlling each component.

In step S701, when the power of the camera 1 is turned on, the overall control CPU 101 causes the microphones 19BL and 19BR for obtaining the user's voices, among the microphone array 19, to operate, and obtains voices. Also, the overall control CPU 101 causes the sound processing unit 104 to operate and executes the following processing.

In step S702, the overall control CPU 101 detects the direction of the user's face based on the output result of the face direction detection unit 20, and determines the direction of directionality of directional sound signals based on the direction of the user's face. Then, directional sound signals are generated by synthesizing the outputs of the microphone 19BL and the microphone 19BR based on the determined direction of directionality with use of the sound processing unit 104, and the directional sound signals are stored into the primary memory 103.

Figure 10A:
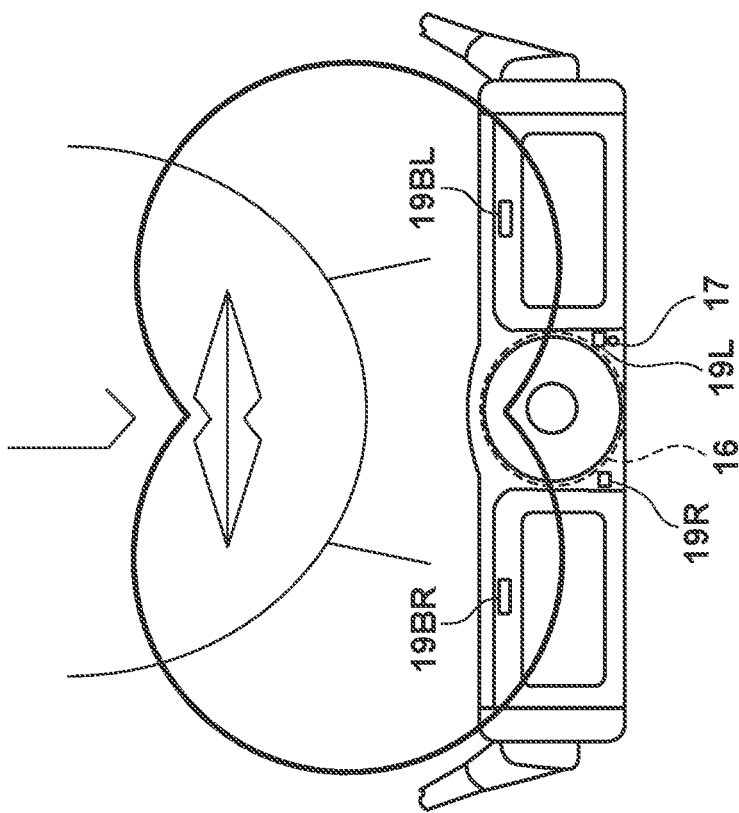
FIGS. 10A and 10B are diagrams showing a change in a sound pickup direction in the first embodiment.
Figure 10B:
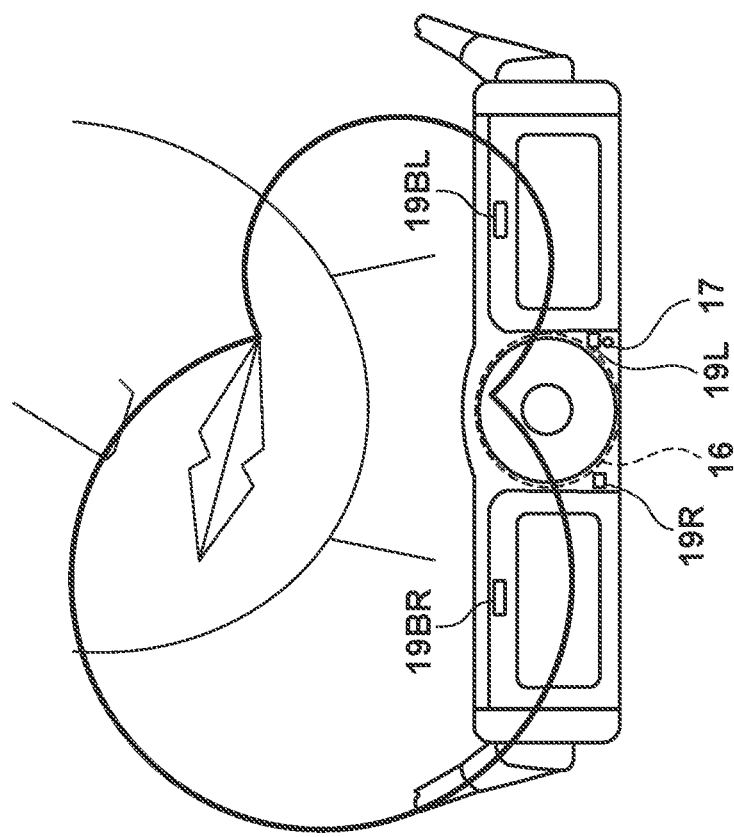

FIGS. 10A and 10B are diagrams showing a relationship between the direction of the face and the direction of a directional sound signals obtained from the microphone 19BR and the microphone 19BL in a state where the microphone 19BR and the microphone 19BL are arranged along the horizontal direction. FIG. 10A shows the direction of the directional sound signals in a case where it has been determined that the face is facing front in the determination of the face direction through the projection of infrared light, which is described using FIG. 9A to FIG. 9C. In this case, the direction of the directional sound signals is 0°.

FIG. 10B shows a recording direction in a case where the user has tilted their face to the right. The sound processing unit 104 calculates a directionality angle θB from the face direction angle θr and the face raising angle θp. The directionality angle θB is an angle formed between the mouth area of FIG. 10A and the moved mouth area, provided that the former is 0°. Then, the sound processing unit 104 sets values of the phase-changing filter so that, for example, the angle of the directional sound signals changes by the directionality angle θB, and applies this phase-changing filter to the output of the microphone 19BR. Also, the sound processing unit 104 calculates a gain amount GB for a microphone from the chin tip distance F. The gain amount GB is set to a value with which a necessarily sound volume can be obtained based on a distance from a microphone position to the mouth area.

As described above, as microphone signals from the microphone 19BR are changed by the directionality angle θB through processing of the phase-changing filter, the synthesized directional sound signals are sound signals in which a voice in the direction of the directionality angle θB has been enhanced.

In a shooting standby state, directional voices stored in the primary memory 103 are not transmitted to the display apparatus 800. Therefore, the obtained directional sound signals are sequentially stored into the memory 103.

Next, in step S703, the overall control CPU 101 determines whether directional sound signals that has been read out from the primary memory 103 includes a voice command registered with the network of the overall control CPU 101. In a case where a voice command is included, processing transitions to step S704 (YES of step S703). In a case where a voice command is not included, the present processing sequence is ended, and processing from step S701 is repeated again (NO of step S703).

In step S704, the overall control CPU 101 controls the camera 1 to execute an operation corresponding to the voice command determined in step S703. For example, in a case where a voice command representing an instruction to start shooting has been detected in a shooting standby state after the power is turned on, the overall control CPU 101 controls the camera 1 and starts shooting processing in accordance with a set mode.

From then on, processing of FIG. 8C is executed repeatedly while the camera 1 is in a power-on state. Also, after the shooting has been started, a voice command is detected in accordance with the following flowchart of FIG. 8D.

Figure 8D:
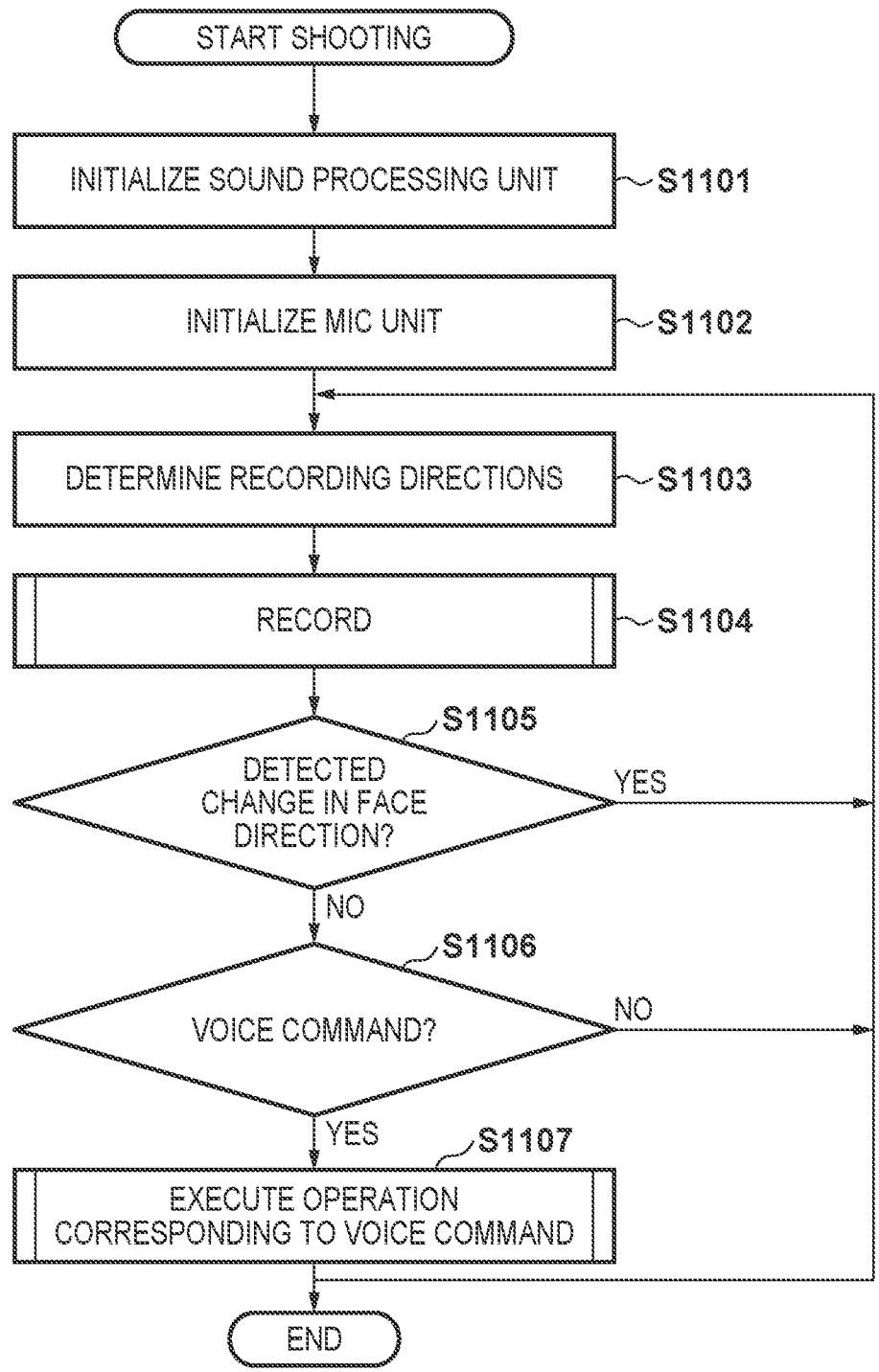
FIG. 8D is a flowchart of recording processing in shooting of step S400 of FIG. 8A.

FIG. 8D is a flowchart of a subroutine of the shooting processing in step S400. Below, this processing will be described also with reference to FIGS. 2A to 2F and FIG. 5.

In step S1101, the overall control CPU 101 initializes the sound processing unit 104. In step S1102, the overall control CPU 101 initializes settings for the microphone array 19. In step S1103, the sound processing unit 104 determines recording directions (directionalities) of the microphones based on the output of the face direction detection unit 20, and controls the direction of the directional sound signals in accordance with the determined direction, as stated earlier.

In step S1104, the overall control CPU 101 records the sound signals obtained by the microphone array 19. The sound signals output from the microphone 19L and the microphone 19R are processed by the sound processing unit 104 and stored into the primary memory 103. The sound signals output from the microphone 19BL and the microphone 19BR are synthesized by the sound processing unit 104, thereby generating directional sound signals. The directional sound signals are stored into the primary memory 103. Here, in a case where the direction of the user's face is as shown in, for example, FIG. 10B in step S1103, as the sound signals from the microphone 19BR have been changed in phase by the directionality angle θB, the synthesized directional sound signals are sound signals in which the voice in the direction of the directionality angle θB has been emphasized, as stated earlier.

In step S1105, the overall control CPU 101 determines whether the output result of the face direction detection unit 20 has been changed. In a case where the output result has not been changed, processing transitions to step S1106 (NO of step S1105). In a case where the output result has been changed, processing returns to step S1103 (YES of step S1105).

In step S1106, the overall control CPU 101 determines whether directional sound signals that have been read out from the primary memory 103 includes a voice command registered with the network of the overall control CPU 101. In a case where a voice command is included, processing transitions to step S1107 (YES of step S1106). In a case where a voice command is not included, processing returns to step S1103 (NO of step S1106).

In step S1107, the overall control CPU 101 controls the camera 1 to execute an operation corresponding to the voice command determined in step S1106.

As described above, in the present embodiment, the direction of the voice to be obtained is changed in accordance with the direction of the user's face so that the voice from the mouth area of the user can be favorably obtained. In this way, a voice command included in the user's voice can be recognized with high accuracy. Also, according to a delay-and-sum method, which is a common beamforming method, in the case of horizontal arrangement where two microphones are located at the same distance from a point sound source, the sensitivity of sound pickup from the point sound source can be obtained using the synthesized outputs of the two microphones. Furthermore, even greater sound pickup sensitivity can be obtained in the direction connecting the two microphones, which is the horizontal direction, relative to the point sound source.

In the present embodiment, provided that the mouth area of the user is a sound source, the microphone 19BL and the microphone 19BR that obtain the user's voice are arranged along the direction in which the user turns their head sideways, which is a horizontal positional arrangement according to a common delay-and-sum method. Therefore, sensitivity to voices in the horizontal direction can be increased also when the user turns their head sideways. Even if the user turns their head during an activity, a voice command included in the user's voice can be recognized with high accuracy.

Second Embodiment

A second embodiment differs from the first embodiment in the arrangement of the microphone array 19 in the camera 1. Note that the present embodiment is a modification of the first embodiment; therefore, among the constituents of a camera system of the second embodiment, the constituents that are the same as those of the camera system of the first embodiment are given the same reference signs thereas, and a description thereof is omitted. Only different constituents will be described.

FIG. 11 is a diagram showing an arrangement of a microphone array in the camera 1 of the second embodiment.

A microphone array 19 is configured to include microphones 19L, 19R, 19BT, and 19BD. The microphones 19BT and 19BD are microphones for obtaining voices of a user. The microphones 19BT and 19BD are arranged to be in a positional relationship where a line connecting the microphone 19BT and the microphone 19BD is parallel to the direction in which the user turns their head vertically when the camera 1 is hung around the user's neck. At this time, provided that the mouth area is a sound source, the microphone 19BT and the microphone 19BD are arranged at vertical positions relative to the sound source. Furthermore, the microphones 19BT and 19BD are arranged at a predetermined distance d1 from each other. The predetermined distance d1 has been set to enable obtainment of sounds in a frequency band of the sound source that is desired to be obtained. In the present embodiment, the predetermined distance d1 has been set to a distance with which voices of the user can be obtained when the camera 1 is hung around the user's neck.

The shooting recording processing of the second embodiment is the same as the flowchart shown in FIG. 8D. FIGS. 12A and 12B are diagrams showing a change in directionality in the vertical direction. FIG. 12A is a diagram showing a sound pickup direction for a case where the camera 1 is hung around the user's neck in the second embodiment. FIG. 12B is a diagram showing a sound pickup direction for a case where the user has moved their head upward from the state of FIG. 12A.

In the second embodiment, when the state of the user has been changed from the state of FIG. 12A to the state of FIG. 12B, the face direction detection unit 20 estimates the direction of the mouth area of the user in step S1103 and step S1104 of FIG. 8D. Based on the direction of the mouth area estimated by the face direction detection unit 20, the sound processing unit 104 sets an amount of delay of a phase delay filter corresponding to the direction of the mouth area, and applies processing of this phase delay filter to sound signals from the microphone 19BT. Then, the outputs of the microphone 19BT and the microphone 19BD are synthesized, thereby generating directional sound signals.

As described above, in the present embodiment, the direction of the sound signals to be obtained is changed in accordance with the direction of the user's face so as to obtain the voice from the mouth area of the user. In this way, a voice command included in the user's voice can be recognized with high accuracy. Also, according to a delay-and-sum method, which is a common beamforming method, in the case of vertical arrangement where a line connecting two microphones and a point sound source are colinear, it is possible to increase the sensitivity of sound pickup from the direction of the point sound source. Furthermore, the sensitivity of sound pickup from other directions can be reduced.

In the present embodiment, provided that the mouth area of the user is a sound source, the microphone 19BT and the microphone 19BD for obtaining the user's voice are arranged along the direction in which the user turns their head vertically, which is a vertical positional arrangement according to a common delay-and-sum method. Therefore, the sensitivity to sounds from directions other than the mouth area of the user can be reduced, and sounds other than the user's voice that is necessary to recognize a voice command become less likely to be picked up. In this way, a voice command included in the user's voice can be recognized with high accuracy.

Note that although the above-described embodiments use the microphones 19BL, 19BR, 19BT, and 19BD as microphones for picking up the voices of the photographer, one of the microphone 19L and the microphone 19R may be further used for the purpose of obtaining the voices of the photographer. In this case, one of the microphone 19L and the microphone 19R is a microphone for obtaining environmental sounds, and the environmental sound are obtained by this one of the microphones and recorded as monaural sounds. Also, three microphones, namely the microphone 19BL, the microphone 19BR, and one of the microphone 19L and the microphone 19R are arranged at a predetermined distance d from one another, and directional voices are generated from voices from these three microphones.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-021865, filed Feb. 15, 2023, which is hereby incorporated by reference herein in its entirety.

What is claimed is:

1. An image capturing apparatus that can be worn by a user as a result of being hung around a neck of the user, the image capturing apparatus comprising:
   an image capturing circuit;
   a first microphone that obtains an environmental sound;
   at least two second microphones that are intended to obtain a voice of the user and are arranged at a first distance from each other;
   a light emitting circuit that emits infrared light toward a face of the user in a state where the image capturing apparatus is worn by the user;
   a light receiving circuit that receives infrared light reflected off the face of the user;
   a CPU; and
   a memory storing a program that, when executed by the CPU, causes the CPU to function as
   a detection unit configured to detect a direction of the face of the user; and
   a sound processing unit that, with use of sound signals from the at least two second microphones, generates a directional sound signal that has directionality corresponding to the direction of the face of the user detected by the detection unit,
   wherein the detection unit detects the direction of the face of the user based on a signal output from the light receiving circuit.

2. The image capturing apparatus according to claim 1, wherein
   in a state where the image capturing apparatus is worn by the user, the at least two second microphones are arranged at positions that are closer to a mouth of the user than the first microphone is.

3. The image capturing apparatus according to claim 1, wherein
   in a state where the image capturing apparatus is worn by the user, the at least two second microphones are arranged in such a manner that a line connecting the at least two second microphones intersects with a line connecting a mouth and a nose of the user.

4. The image capturing apparatus according to claim 3, wherein
   in a state where the image capturing apparatus is worn by the user, the at least two second microphones are arranged at positions on opposite sides, with the mouth of the user located therebetween.

5. The image capturing apparatus according to claim 1, wherein
   in a state where the image capturing apparatus is worn by the user, the at least two second microphones are arranged in such a manner that a line connecting the at least two second microphones is parallel to a line connecting a mouth and a nose of the user.

6. The image capturing apparatus according to claim 5, wherein
   in a state where the image capturing apparatus is worn by the user, the at least two second microphones are arranged below the mouth of the user.

7. The image capturing apparatus according to claim 1, wherein
   in a state where the image capturing apparatus is worn by the user, the at least two second microphones are arranged at a second distance from the first microphone in a direction connecting a mouth and a nose of the user.

8. The image capturing apparatus according to claim 1, wherein
   the first distance is a distance with which a sound in a frequency of a voice of the user can be obtained using the at least two second microphones.

9. The image capturing apparatus according to claim 1, wherein
   the sound processing unit generates the directional sound signal in which a sound from a direction of a mouth of the user is emphasized.

10. The image capturing apparatus according to claim 1, wherein
    the sound processing unit detects a voice command of the user from the directional sound signal.

11. The image capturing apparatus according to claim 1, wherein
    the light emitting circuit emits infrared light toward a chin of the user.

12. The image capturing apparatus according to claim 1, wherein
    the detection unit binarizes the signal from the light receiving circuit, and detects the direction of the face of the user based on the binarized signal.

13. The image capturing apparatus according to claim 1, further comprising:
    a connection member that allows the image capturing apparatus to be worn by the user; and
    a main body that includes the image capturing circuit, the first microphone, the at least two second microphones, the CPU, and the memory,
    wherein the image capturing apparatus includes an annular casing, and the connection member and the main body compose a part of the annular casing.

* * * * *